(12) United States Patent
Krichevsky et al.

(10) Patent No.: US 9,484,051 B1
(45) Date of Patent: Nov. 1, 2016

(54) METHOD AND SYSTEM FOR REDUCING UNDESIRABLE REFLECTIONS IN A HAMR WRITE APPARATUS

(71) Applicants: Western Digital Technologies, Inc., Irvine, CA (US); The Provost, Fellows, Foundation Scholars and the other members of Board, of the College of the Holy and Undivided Trinity of Queen Elizabeth near Dublin, Dublin (IE)

(72) Inventors: Alexander Krichevsky, Cupertino, CA (US); Christopher B. Wolf, San Jose, CA (US); Frank D. Bello, Jackson, CA (US); Kyle E. Ballantine, Limerick (IE); John Donegan, Dublin (IE); David Michael Owen McCloskey, Dublin (IE)

(73) Assignees: THE PROVOST, FELLOWS, FOUNDATION SCHOLARS AND THE OTHER MEMBERS OF BOARD, OF THE COLLEGE OF THE HOLY AND UNDIVIDED TRINITY OF QUEEN ELIZABETH NEAR DUBLIN, Dublin (IE); WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/936,584

(22) Filed: Nov. 9, 2015

(51) Int. Cl.
*G11B 5/60* (2006.01)
*G11B 5/48* (2006.01)
*G11B 5/00* (2006.01)
*G11B 5/02* (2006.01)

(52) U.S. Cl.
CPC .......... *G11B 5/4866* (2013.01); *G11B 5/6088* (2013.01); *G11B 5/02* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |

(Continued)

*Primary Examiner* — Brian Butcher
(74) *Attorney, Agent, or Firm* — Convergent Law Group LLP

(57) ABSTRACT

A heat-assisted magnetic recording (HAMR) write apparatus is coupled with a laser that provides energy. The HAMR write apparatus includes a pole, at least one coil, a waveguide, a near-field transducer (NFT) and at least one antireflective mechanism. The pole writes to a region of the media and includes a media-facing surface. The coil(s) energize the pole. The waveguide is optically coupled with the laser and includes a core and cladding. The waveguide is for directing a portion of the energy toward the NFT, which is located in a transmission direction from the core of the waveguide. The antireflective mechanism(s) are in at least one of a first position in the waveguide, a second position in the NFT and a third position between the waveguide and the NFT.

20 Claims, 11 Drawing Sheets

(56) References Cited

U.S. PATENT DOCUMENTS

| | | |
|---|---|---|
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |

(56) References Cited

U.S. PATENT DOCUMENTS

| | | |
|---|---|---|
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,935 B2 | 9/2006 | Challener |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |

(56) References Cited

U.S. PATENT DOCUMENTS

| | | |
|---|---|---|
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |

(56) References Cited

U.S. PATENT DOCUMENTS

| | | |
|---|---|---|
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,848,318 B2 | 9/2014 | Tsuchiyama et al. |
| 2007/0242921 A1* | 10/2007 | Matsumoto ............ B82Y 20/00 385/33 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0279310 A1 | 10/2013 | Zhong et al. |
| 2014/0133284 A1 | 5/2014 | Heidmann |
| 2014/0154529 A1 | 6/2014 | Yang et al. |
| 2014/0175050 A1 | 6/2014 | Zhang et al. |

* cited by examiner

METHOD AND SYSTEM FOR REDUCING UNDESIRABLE REFLECTIONS IN A HAMR WRITE APPARATUS

BACKGROUND

Conventional heat assisted magnetic recording (HAMR) utilizes a laser in a conjunction with magnetic recording technology to write to magnetic media in a disk drive. Light is provided from a laser to a waveguide in a HAMR transducer fabricated on a slider. The light travels through the waveguide toward the air-bearing surface (ABS) and is coupled into a near-field transducer (NFT) via evanescent coupling. Thus, the exponential tail of the waveguide mode in the cladding of the waveguide may excite the plasmons in the NFT. Through these plasmons, the NFT couples light into the media at a spot size smaller than the optical diffraction limit, heating a region of the media. Coils in the transducer energize the main pole to magnetically write to a portion of the media heated by the spot size at a relatively modest field. Thus, data may be written to the media.

In order to obtain the desired performance, lifetime and reliability of the HAMR transducer, various factors are desired to be optimized. For extended laser and NFT lifetime, a high coupling efficiency is desired between the optical components. For example, optical coupling from the laser to the waveguide and from the waveguide to the NFT are desired to be improved. In addition, leakage of light from the components is desired to be small. For example, leakage of light from the waveguide to the media is undesirable because such leakage adversely affects writing performance and may degrade adjacent tracks. The laser power is also desired to be stable, both for improved writing efficiency and for laser lifetime. Other factors may also contribute to the performance and reliability of the HAMR writer. Thus, continued improvements in the HAMR transducer are desired.

DETAILED DESCRIPTION OF THE PREFERRED EMBODIMENTS

Figure 1:
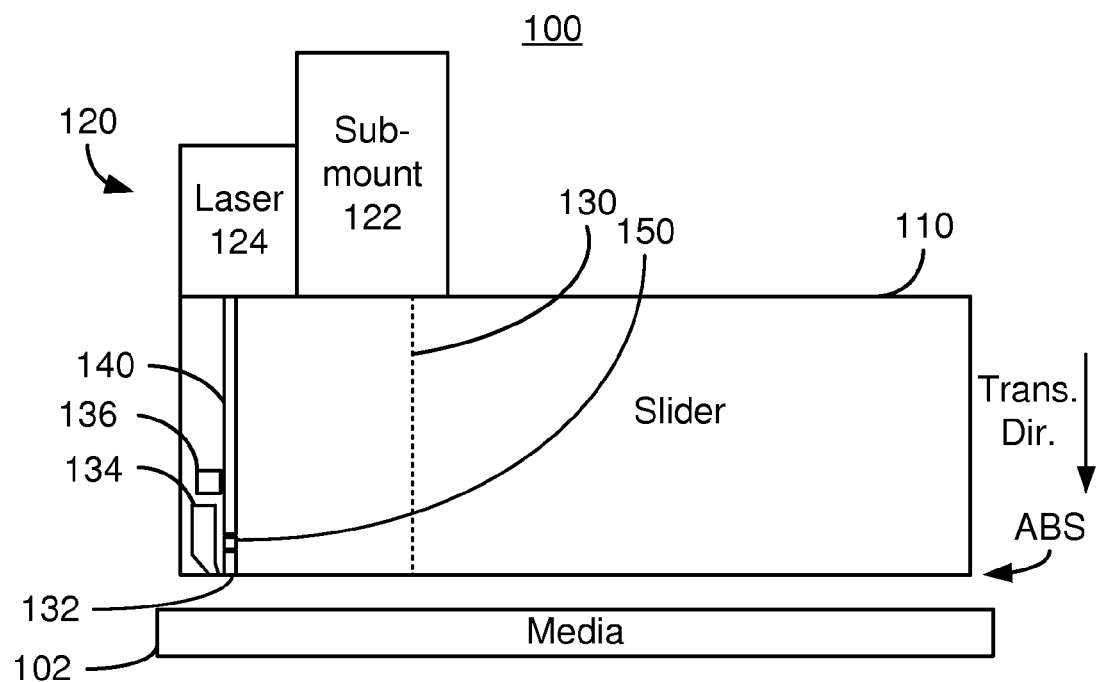
FIG. 1 is a side view of an exemplary embodiment of a HAMR disk drive.

FIG. 1 depicts an exemplary embodiment of a heat assisted magnetic recording (HAMR) disk drive. 100. For simplicity not all portions of the HAMR disk drive 100 are shown. In addition, although the HAMR disk drive 100 is depicted in the context of particular components other and/or different components may be used. For simplicity, only single components are shown. However, multiples of the component(s) and/or their sub-component(s) might be used. Further, although described in the context of the HAMR disk drive 100 and other HAMR write apparatus, the apparatus and method described herein may be used in connection with other data storage devices.

The HAMR disk drive 100 includes media 102, a slider 110, a laser subassembly 120 and a HAMR transducer 130. Additional and/or different components may be included in the HAMR disk drive 100. The slider 110, the laser subassembly 120 and HAMR transducer 120 are generally attached to a suspension (not shown). The HAMR transducer 130 is fabricated on the slider 110 and includes an air-bearing surface (ABS) proximate to and facing the media 102 during use.

In general, the HAMR disk drive 100 includes a write transducer and a read transducer. However, for clarity, only the write portion (HAMR transducer 130) is shown. The HAMR transducer 130 includes optional near-field transducer (NFT) 132, a write pole 134, coil(s) 136, waveguide 140 and antireflective mechanism 150. In other embodiments, different and/or additional components may be used in the HAMR transducer 130. The pole 134 includes a portion that faces the media 102. In the embodiment shown, this portion of the pole 134 is at the ABS and is used to magnetically write data to the media 102. For simplicity, only one turn of one coil 136 is shown. However, multiple turns are typically used. In addition, multiple coils may be used. The coil 136 may be a helical coil (having its turns wound around the pole 134) or a spiral coil (having its turns residing completely on one side of the pole 134). A write current driven through the coil 136 is used to energize the pole 134.

The laser subassembly 120 includes a laser 124, a submount 122. An optional photodetector (not shown) may also be present. The laser 124 may be an edge emitting laser diode or other laser. The laser subassembly 120 is generally affixed to the back side (the side opposite the ABS) of the slider 110. However, other locations are possible. The submount 122 is a substrate to which the laser 124 may be affixed for mechanical stability and ease of integration with the slider 110. The photodetector may be used to sample the light provided from the laser 124 to the HAMR transducer 130. Thus, the laser 122 may be controlled via feedback obtained from the photodetector. However, other configurations are possible.

The waveguide 140 is optically coupled with the laser 124 and NFT 132, which resides near the ABS. The waveguide 140 may include multiple components and/or may have a geometry that is configured for a particular function. For example, tapered sections, inverse tapered sections, mode converter(s) and/or light concentrating sections might be included within the waveguide 140. The waveguide 140 carries light from the laser 124 toward the NFT 132. In some embodiments, the waveguide terminates at the NFT 132. The light carried by the waveguide 140 is predominantly localized within the waveguide core. Thus, the core can be considered to be depicted in FIG. 1. However, an exponentially decaying tail portion of the light may be carried by the surrounding waveguide cladding. The NFT 132 is optically coupled with the waveguide 140. The NFT 132 is in the transmission direction from the waveguide 140. Stated differently, the NFT 132 is aligned with the core of the waveguide 140. The localized light within the core of the waveguide 140 excites the plasmons in the NFT 132.

Also shown in FIG. 1 is antireflective mechanism 150. The antireflective mechanism 150 is shown as residing between the waveguide 140 and the NFT 132. However, the antireflective mechanism 150 could be at another location. For example, the antireflective mechanism 150 might be incorporated in the waveguide 140, incorporated in the NFT 132 or be at another location. Although a single antireflective mechanism 150 is shown, in principle multiple antireflective mechanisms 150 might be used. However, it may be more desirable to use a single antireflective mechanism 150 that accounts for some or all of the unwanted reflections in the HAMR transducer 130. The antireflection mechanism 150 may, for example, be a dielectric having a different index of refraction than surrounding structures, a metal, a grating or other component(s) which may cause light reflected back toward the laser 124 to destructively interfere. In general, the geometry of the antireflective mechanism may be determined using optical theory.

For example, the antireflective mechanism 150 may be a dielectric trench, located within the waveguide 140. The dielectric trench is so termed because it may be fabricated by forming a trench and refilling the trench with the dielectric. Reflected light traveling back toward the laser 124 (in the opposite direction of the transmission direction shown in FIG. 1) may cross into the dielectric trench and be again reflected in the direction of transmission at the transition between the dielectric trench and the waveguide 140. Note that some light is transmitted while other light is reflected at this transition. The (twice) reflected light may be reflected from the other interface between the dielectric trench and the waveguide 140. A part of the light is also transmitted through the interface. This (thrice) reflected light again travels toward the laser 124. This multiple reflection/transmission process may be mathematically described. Based on this mathematical model, the thickness of the dielectric trench for the antireflective mechanism 150 and index of refraction for the dielectric trench may be determined. For example, the antireflective mechanism 150 may be configured such that the thickness of the dielectric trench is an integral number of quarter wavelengths of light plus an integral number of half wavelengths, where the wavelength of light is measured in the antireflective mechanism 150. In some such embodiments, the desired index of refraction, n, of the dielectric trench may be a geometric mean of the indices of refraction of the materials surrounding the dielectric trench at the interfaces ($\sqrt{n}=\sqrt{(n1*n2)}$). Other configurations, other materials and/or other indices of refraction may be used. Thus, the antireflective mechanism 150 may diminish or remove reflected light from traveling back toward the laser 124.

In operation, the light from the laser 124 is transmitted to the waveguide 140. The light is propagated through the waveguide 140 and coupled into the NFT 132. Instead of an evanescent coupling, light concentrated in the core of the waveguide 140 coupled into the NFT 132 to excite plasmons in the NFT 132. This is termed direct fire coupling because the NFT 132 may be aligned with the core of the waveguide 140 in the direction of transmission of the light. Thus, light localized in the core of the waveguide 140 may be directly fired at the NFT 132. The NFT 132 transfers energy to the media 102 in a desired region. The desired portion of the media 102 may be heated. Coil(s) 136 energize the pole 134, which writes to the desired portion of the media. Further, the antireflective mechanism 150 resides in the optical path between the laser 124 and the media 102. The antireflective mechanism 150 is configured to reduce or eliminate reflected light in the optical path between the laser 124 and the media 102. Thus, the antireflective mechanism 150 may mitigate issues that arise due to reflections in the light traveling from the laser 124 to the NFT 132.

The HAMR disk drive 100 may have improved performance. Because the NFT 132 is aligned with the waveguide core (i.e. in the transmission direction for part of the energy carried by the waveguide), the coupling between the waveguide 140 and the NFT 132 may have improved efficiency. Thus, fewer losses may result. However, there may be reflections from the NFT 132. Such reflections will be propagated in the opposite direction through the waveguide 140 and back to the laser 124. Without the antireflective mechanism 150, such reflections may adversely affect performance. For example, the reflections that travel back to the laser 124 might destabilize the operation of the laser 124. The antireflective mechanism 150 may reduce or eliminate such reflections. Thus, the stability of the laser power may be improved. Thus, optical coupling may be improved without adversely impacting the laser performance. Consequently, performance, reliability and lifetime of the HAMR disk drive 100 may be enhanced.

Figure 2A:
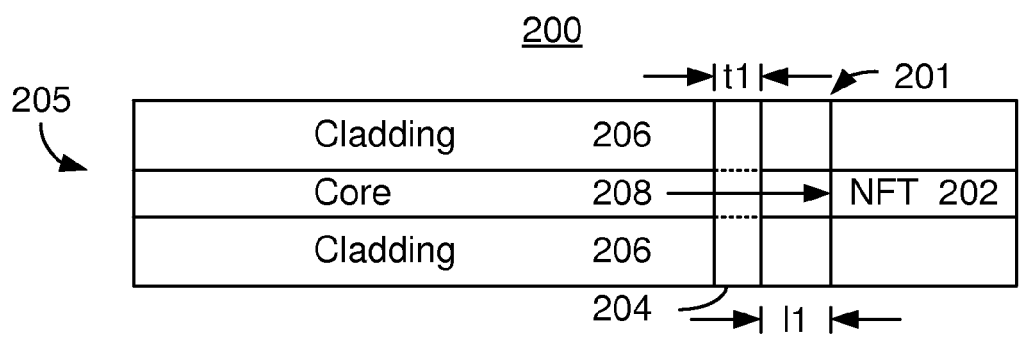
FIGS. 2A and 2B are side and plan views depicting a portion of an exemplary embodiment of a HAMR write apparatus including a waveguide and an antireflective mechanism.
Figure 2B:
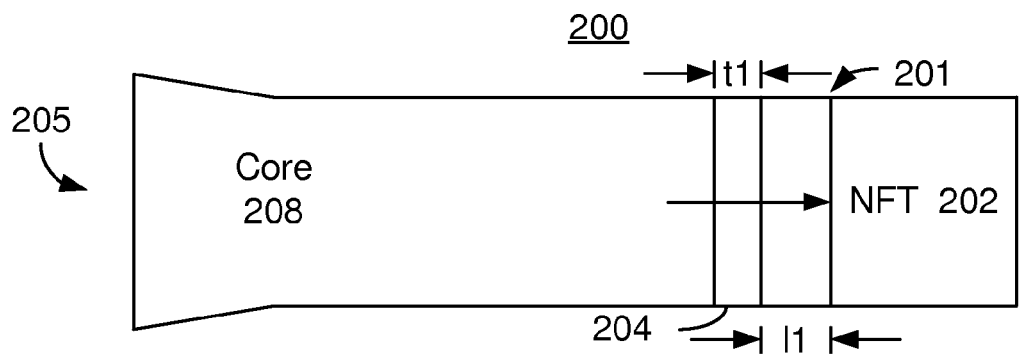

FIGS. 2A and 2B are side and plan views depicting a portion of an exemplary embodiment of a HAMR write apparatus 200 including an NFT 202, an antireflective mechanism 204 and a waveguide 205. The HAMR write apparatus 200 may be analogous to the HAMR transducer 130 and may reside in a disk drive analogous to the disk drive 100. For clarity, FIGS. 2A and 2B are not to scale.

The waveguide 205 is analogous to the waveguide 140. The waveguide 205 is shown as explicitly including a core 208 and cladding 206. As discussed above, light from the laser (not shown in FIGS. 2A and 2B) is concentrated in the core 208 of the waveguide 205. However, some portion of the light, such as the exponential tail, may be propagated via the cladding 206. The light propagates through the waveguide 205 toward the NFT 202 in a direction of transmission shown by the arrow in the core 208. Although shown as a straight waveguide with only some tapering, in other embodiments, the waveguide 205 may have another geometry including but not limited to a curved path and/or other tapers. The NFT 202 is in the direct fire configuration. Thus, the NFT 202 is aligned with the core 208 of the waveguide 205. In the embodiment shown, the NFT 202 may be a metal NFT. In other embodiments, other materials might be used. Plasmons in the NFT 202 may be excited by the energy carried by the core 208. However, at the interface 201 between the waveguide 205 and the NFT 202, significant reflections may occur. To counteract this, the antireflective mechanism 204 is included.

In the HAMR write apparatus 200, the antireflective mechanism 204 is located within the waveguide 205. The antireflective mechanism 204 may account for reflections at the interface 201. The interface 201 may also be considered the entrance surface of the NFT 202 because the interface 201 is the boundary between the waveguide 205 and the NFT 202. The antireflective mechanism 204 may be an antireflective trench. To fabricate the antireflective trench 204, portions of both the core 208 and cladding 206 of the waveguide 205 may be removed. A trench is thus formed in the waveguide 205. The trench is filled with a material that can be used to reduce or eliminate reflected light. Thus, the antireflective trench 204 is provided. The antireflective trench 204 has a thickness, t1, in the transmission direction and is a distance, l1, from the interface 201 with the NFT. The thickness along the transmission direction, t1, is selected to reduce reflections in a reflection direction opposite to the transmission direction. For example, if the antireflective trench 204 is a dielectric trench, then the material used to fill the trench is a dielectric. In such an embodiment, the thickness of the antireflective trench 204 may be one-fourth of the wavelength plus an integral number of one-half wavelengths, where the wavelength is the wavelength in the antireflective trench 204. The wavelength measures described herein are to within processing limitations in some embodiments. In addition, other thicknesses may be used. The dielectric used for the antireflective trench 204 may have a high index of refraction as compared with the remainder of the waveguide 205. Thus, the antireflective trench 204 may have an index of refraction that is not less than the index of refraction of the core 208. Dielectric materials that might be used for the antireflective trench 204 include but are not limited to titanium dioxide, strontium titanate, lead titanate, silicon carbide, gallium arsenide, tantalum oxide, silicon oxide and silicon carbide. In other embodiments, the antireflective trench 204 may be a metal trench in which the material used to fill the trench is a metal. In such an embodiment, the thickness of the antireflective trench 204 is not more than one and one half multiplied by a metal skin depth. Materials that might be used for the antireflective trench 204 in such an embodiment may include gold, chromium and/or titanium. In other embodiments, the antireflective mechanism 204 may be another structure. However, in discussing FIGS. 2A-7B, the antireflective mechanism is termed an antireflective trench. In some embodiments, the distance between the antireflective trench 204 and the interface 201 with the NFT 202, l1, is not more than ten wavelengths. In some cases, l1 is at least two wavelengths. Note that for this distance, the wavelength is measured in the core 208 of the waveguide 205. However, the antireflective trench 204 may be located a different distance from the interface of the waveguide 205 with the NFT 202, including but not limited to at the interface 201.

In operation, light from the laser (not shown) travels through the waveguide 205 in the transmission direction and is coupled into the NFT 202. Writing may take place as described above. Light reflected at the interface 201 with the NFT 202 travels in the opposite direction. Because of the presence of the antireflective trench 204, the reflected light undergoes destructive interference. Thus, reflected light reaching the laser may be reduced or eliminated.

The HAMR write apparatus 200 may have improved performance. As discussed above for the HAMR disk drive 100, optical coupling may be improved without adversely affecting stability and performance of other components, such as the laser. Thus, performance, reliability and lifetime of the HAMR write apparatus 200 may be improved.

Figure 3A:
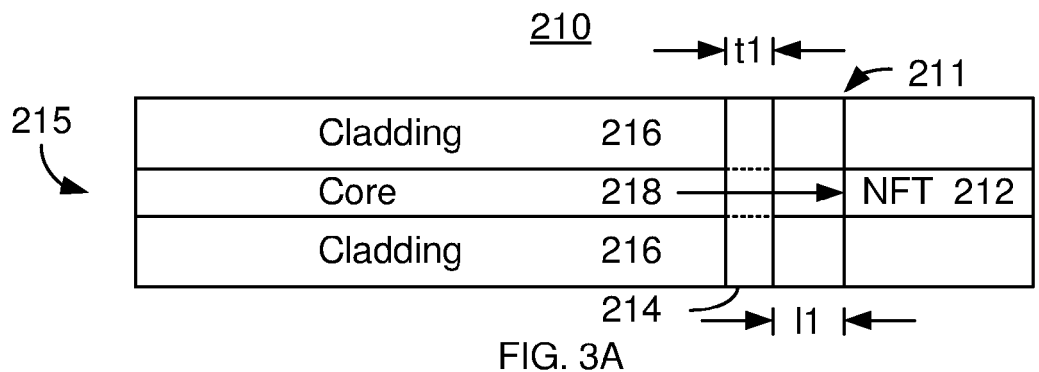
FIGS. 3A and 3B are side and plan views depicting a portion of another exemplary embodiment of a HAMR write apparatus including a waveguide and an antireflective mechanism.
Figure 3B:
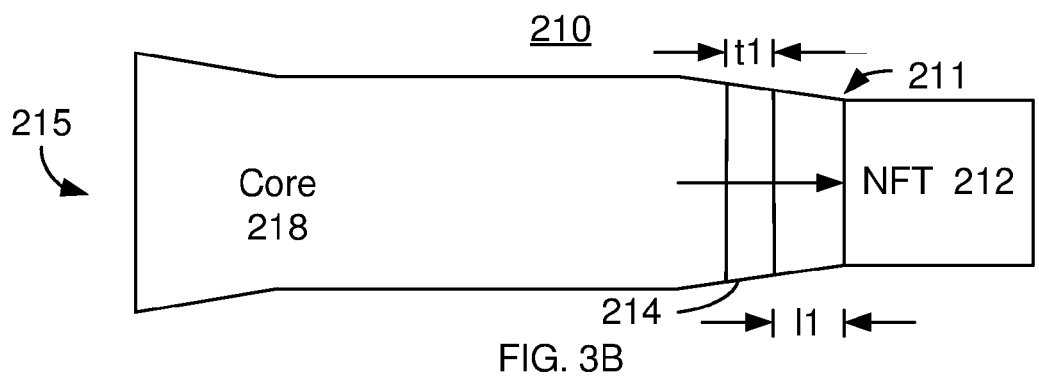

FIGS. 3A and 3B are side and plan views depicting a portion of an exemplary embodiment of a HAMR write apparatus 210 including an NFT 212, an antireflective mechanism 214 and a waveguide 215. The HAMR write apparatus 210 is analogous to the HAMR transducer 130 and HAMR write apparatus 200. The HAMR write apparatus 210 may reside in a disk drive analogous to the disk drive 100. For clarity, FIGS. 3A and 3B are not to scale.

The waveguide 215 is analogous to the waveguides 140 and 205. The waveguide 215 explicitly includes a core 218 and cladding 216 analogous to the core 208 and cladding 206, respectively. The light propagates through the waveguide 215 toward the NFT 212 in a direction of transmission shown by the arrow in the core 218. Although shown as nominally straight, in other embodiments, the waveguide 215 may have another geometry including but not limited to a curved path. The core 218 of the waveguide 215 is shown as having multiple tapers, which may function to concentrate light propagating through the waveguide. To this extent, the waveguide 215 may be considered to include light concentrating elements. Other components could be included in the waveguide 215.

The NFT 212 is in the direct fire configuration and analogous to the NFTs 132 and 202. The NFT 212 is aligned with the core 218 of the waveguide 215. In the embodiment shown, the NFT 212 may be metal. In other embodiments, other materials might be used. At the interface 211 between the waveguide 215 and the NFT 212, significant reflections may occur. To counteract this, the antireflective mechanism 214 is included.

The antireflective mechanism 214 is located within the waveguide 215 and is analogous to the antireflective mechanisms 204 and 150. The antireflective mechanism 214 is an antireflective trench. The antireflective trench 214 is configured to reduce reflections in a reflection direction opposite to the transmission direction. The geometry and materials used in the antireflective trench 214 are thus analogous to those for the antireflective trench 204. Thus, the thickness, t1, distance to the interface 211, l1 and/or materials used may be analogous to the thickness, distance to the interface 201 and materials used in the antireflective trench 204. Because of the presence of the antireflective trench 214, the light reflected from the interface 211, as well as other interfaces between the antireflective trench and media (not shown) may undergo destructive interference. In this configuration, the antireflective trench 214 may account for reflections at the interface 211. Thus, reflected light reaching the laser may be reduced or eliminated.

The HAMR write apparatus 210 may have improved performance. Through the use of the antireflective trench 214, optical coupling may be improved without adversely affecting stability and performance of other components, such as the laser. Thus, performance, reliability and lifetime of the HAMR write apparatus 210 may be improved.

Figure 4A:
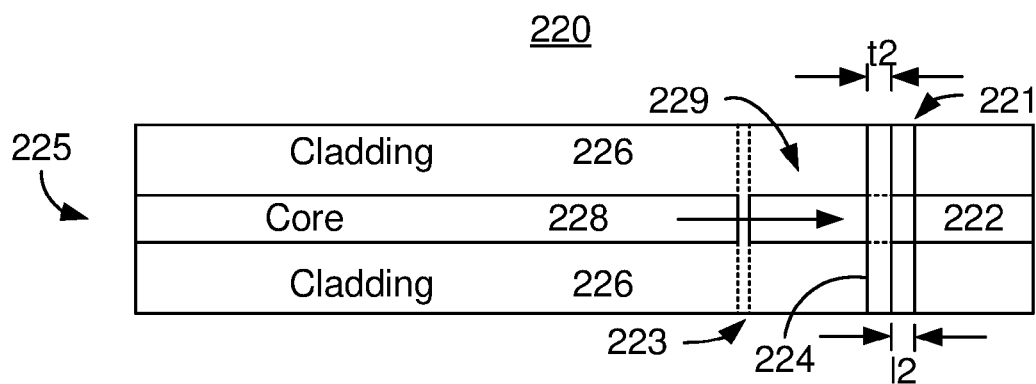
FIGS. 4A and 4B are side and plan views depicting a portion of another exemplary embodiment of a HAMR write apparatus including a waveguide and an antireflective mechanism.
Figure 4B:
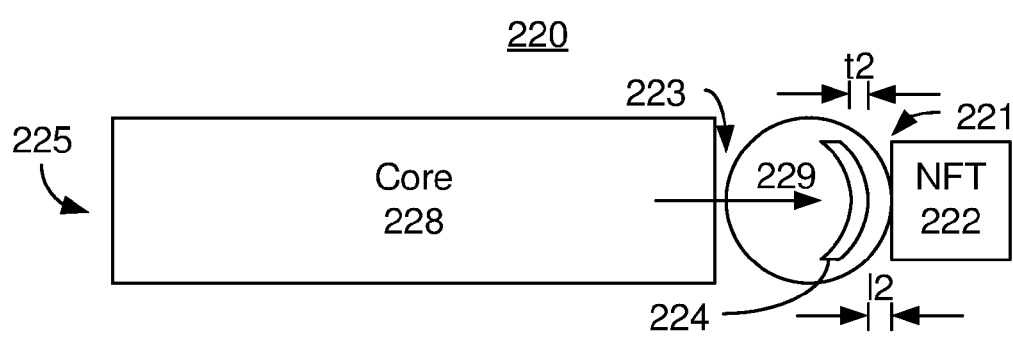

FIGS. 4A and 4B are side and plan views depicting a portion of an exemplary embodiment of a HAMR write apparatus 220 including an NFT 222, an antireflective mechanism 224 and a waveguide 225. The HAMR write apparatus 220 is analogous to the HAMR transducer 130 and HAMR write apparatus 200 and 210. The HAMR write apparatus 220 may reside in a disk drive analogous to the disk drive 100. For clarity, FIGS. 4A and 4B are not to scale.

The waveguide 225 is analogous to the waveguides 140, 205 and 215. The waveguide 225 explicitly includes a core 228 and cladding 226 analogous to the core and cladding, respectively, of the waveguides 205 and 215. The light propagates through the waveguide 225 toward the NFT 222 in a direction of transmission shown by the arrow in the core 228. Although shown as nominally straight, in other embodiments, the waveguide 225 may have another geometry including but not limited to a curved path. The core 228 of the waveguide 225 is shown being straight but may have one or more tapers or other components.

The NFT 222 is in the direct fire configuration and analogous to the NFTs 132, 202 and 212. The NFT 222 is aligned with the core 228 of the waveguide 225. In the embodiment shown, the NFT 222 may be metal. In other embodiments, other materials might be used. At the interface 221 between the light concentrating element 229 and the NFT 222, significant reflections may occur. To counteract this, the antireflective mechanism 224 is included.

In addition, the optical path of the HAMR write apparatus 220 includes a light concentrating element 229. In the embodiment shown, the light concentrating element 229 is a microdisk. However, other light concentrating elements and/or other components might be used. Also shown is a gap 223 between the core 228 of the waveguide 225 and the light concentrating element 229. Thus, light from the laser traverses the waveguide 225, is transmitted to the light concentrating element 229 and then coupled into the NFT 222.

The antireflective mechanism 224 is located within the light concentrating element 229 and is analogous to the antireflective mechanisms 204, 214 and 150. The antireflective mechanism 224 may be an antireflective trench. The antireflective trench 224 is configured to reduce reflections in a reflection direction opposite to the transmission direction. The geometry and materials used in the antireflective trench 224 are thus analogous to those for the antireflective trenches 204 and/or 214. Thus, the thickness, t2, distance to the interface 221, l2, and/or materials used may be analogous to the thickness (t1), distance to the interface 201 (l1) and materials used in the antireflective trenches 204 and/or 214. Because of the presence of the antireflective trench 224, the light reflected from the interface 221, as well as other interfaces between the antireflective trench and media (not shown) may undergo destructive interference. In this configuration, the antireflective mechanism 224 may account for reflections at the interface 221. Thus, reflected light reaching the laser may be reduced or eliminated.

The HAMR write apparatus 220 may have improved performance. Through the use of the antireflective trench 224, optical coupling may be improved without adversely affecting stability and performance of other components, such as the laser. Thus, performance, reliability and lifetime of the HAMR write apparatus 220 may be improved.

Figure 5A:
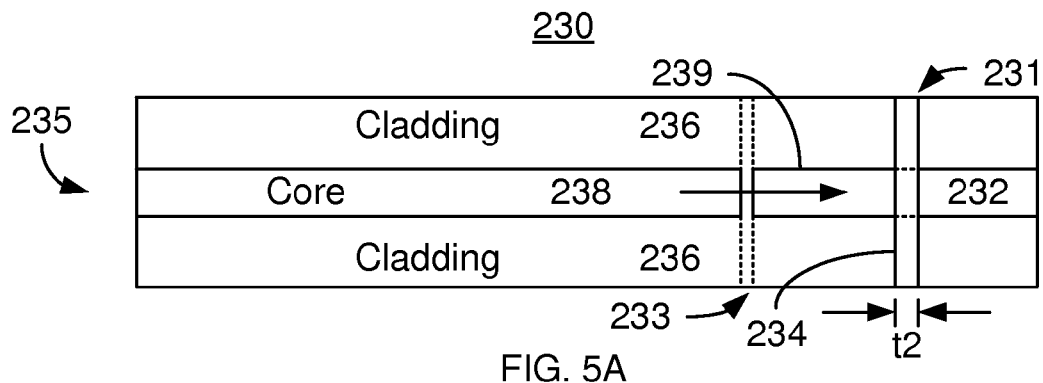
FIGS. 5A and 5B are side and plan views depicting a portion of another exemplary embodiment of a HAMR write apparatus including a waveguide, an antireflective mechanism and a light concentrating element.
Figure 5B:
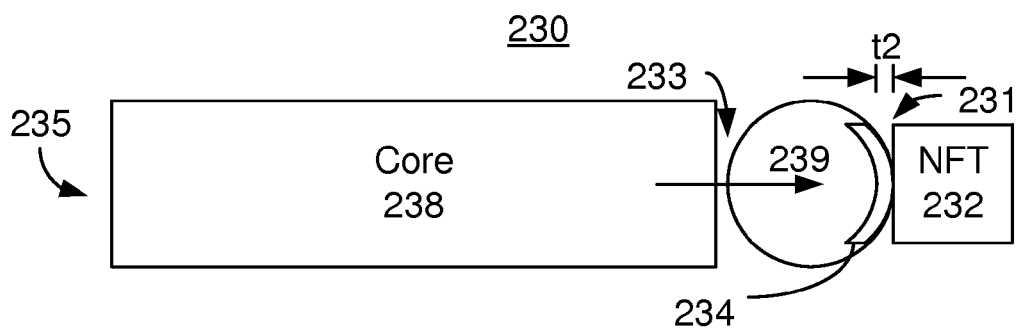

FIGS. 5A and 5B are side and plan views depicting a portion of an exemplary embodiment of a HAMR write apparatus 230 including an NFT 232, an antireflective mechanism 234, a waveguide 235 and a light concentrating element 239. The HAMR write apparatus 230 is analogous to the HAMR transducer 130 and HAMR write apparatus 200, 210 and 220. The HAMR write apparatus 230 may reside in a disk drive analogous to the disk drive 100. For clarity, FIGS. 5A and 5B are not to scale. The waveguide 235 is analogous to the waveguides 140, 205, 215 and 225. Similarly, the NFT 232 is analogous to the NFTs 132, 202, 212 and 222. The light concentrating element 239 is analogous to the light concentrating element 229. The waveguide 235 includes a core 238 and cladding 236 analogous to the core and cladding, respectively, of the waveguides 205, 215 and 225. The light concentrating element 239 is separated from the waveguide 235 by a gap 233. The structure and function of the components 232, 234, 235 and 239 is analogous to that of the components 202/212/222, 204/214/224, 205/215/225, and 229.

The antireflective mechanism 234 is located within the light concentrating element 239 and is analogous to the antireflective mechanisms 204, 214, 224 and 150. In this case, however, the antireflective mechanism is at the interface 231 between the light concentrating element 239 and the NFT 232. Stated differently, l2 is zero. In this configuration, the antireflective mechanism 234 may account for reflections at the interface 231.

The HAMR write apparatus 230 may have improved performance. Through the use of the antireflective trench 234, optical coupling may be improved without adversely affecting stability and performance of other components, such as the laser. Thus, performance, reliability and lifetime of the HAMR write apparatus 230 may be improved.

Figure 6A:
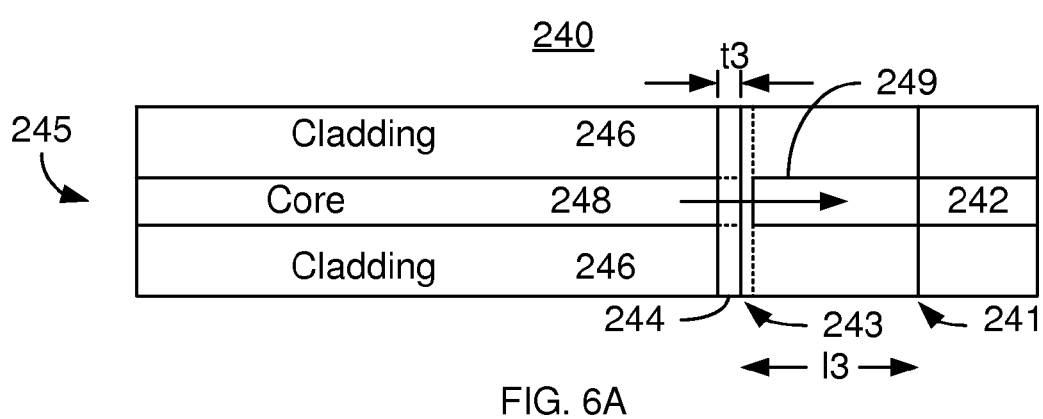
FIGS. 6A and 6B are side and plan views depicting a portion of another exemplary embodiment of a HAMR write apparatus including a waveguide, an antireflective mechanism and a light concentrating element.
Figure 6B:
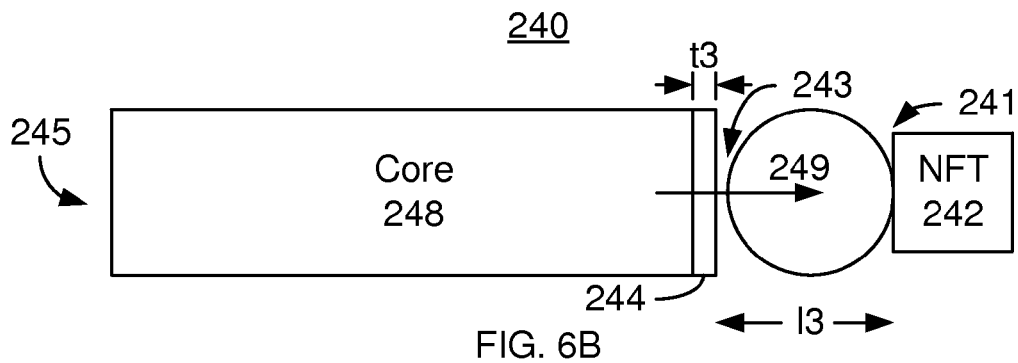

FIGS. 6A and 6B are side and plan views depicting a portion of an exemplary embodiment of a HAMR write apparatus 240 including an NFT 242, an antireflective mechanism 244, a waveguide 245 and a light concentrating element 249. The HAMR write apparatus 240 is analogous to the HAMR transducer 130 and HAMR write apparatus 200, 210, 220 and 230. The HAMR write apparatus 240 may reside in a disk drive analogous to the disk drive 100. For clarity, FIGS. 6A and 6B are not to scale. The waveguide 245 is analogous to the waveguides 140, 205, 215, 225 and 235. Similarly, the NFT 242 is analogous to the NFTs 132, 202, 202, 212, 222 and 232. The light concentrating element 249 is analogous to the light concentrating elements 229 and 239. The waveguide 245 includes a core 248 and cladding 246 analogous to the core and cladding, respectively, of the waveguides 205, 215, 225 and 235. The light concentrating element 249 is separated from the waveguide 245 by a gap 243. The structure and function of the components 242, 244, 245 and 249 is analogous to that of the components 202/212/222/232, 204/214/224/234, 205/215/225/235, and 229/239.

The antireflective mechanism 244 is located within the waveguide 245 and is analogous to the antireflective mechanisms 204, 214, 224, 234 and 150. In this case, however, the antireflective mechanism is at the interface between the waveguide 245 and the light concentrating element 249 and the NFT 232. The thickness, t3, of the antireflective mechanism 244 is selected to provide for destructive interference. The antireflective mechanism is located a distance l3 from the interface 241. In this location, the antireflective mechanism 244 may account for reflections at the interface 241 (between the light concentrating element 249 and the NFT 242) and for reflections between the waveguide 245 and the light concentrating element 249.

The HAMR write apparatus 240 may have improved performance. Through the use of the antireflective trench 244, optical coupling may be improved without adversely affecting stability and performance of other components, such as the laser. Thus, performance, reliability and lifetime of the HAMR write apparatus 240 may be improved.

Figure 7A:
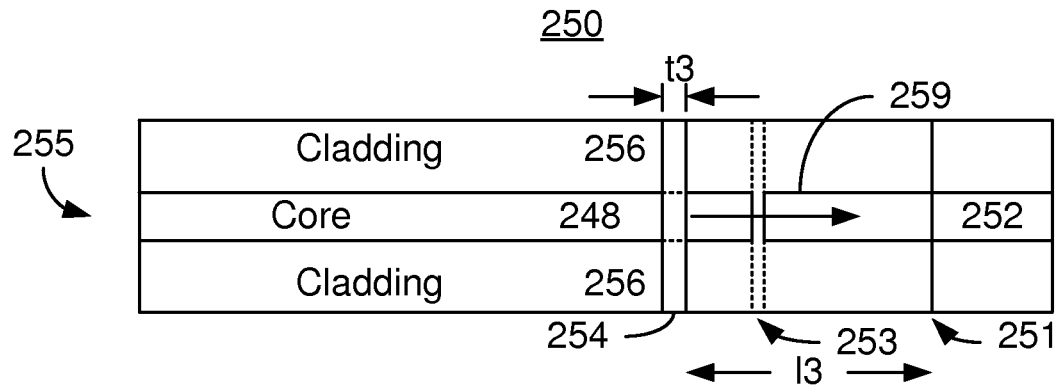
FIGS. 7A and 7B are side and plan views depicting a portion of another exemplary embodiment of a HAMR write apparatus including a waveguide, an antireflective mechanism and a light concentrating element.
Figure 7B:
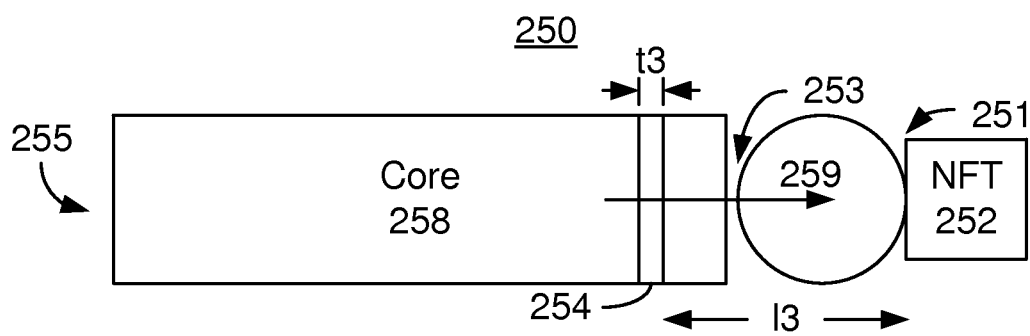

FIGS. 7A and 7B are side and plan views depicting a portion of an exemplary embodiment of a HAMR write apparatus 250 including an NFT 252, an antireflective mechanism 254, a waveguide 255 and a light concentrating element 259. The HAMR write apparatus 250 is analogous to the HAMR transducer 130 and HAMR write apparatus 200, 210, 220, 230 and 240. The HAMR write apparatus 250 may reside in a disk drive analogous to the disk drive 100. For clarity, FIGS. 7A and 7B are not to scale. The waveguide 255 is analogous to the waveguides 140, 205, 215, 225, 235 and 245. Similarly, the NFT 252 is analogous to the NFTs 132, 202, 202, 212, 222, 232 and 242. The light concentrating element 259 is analogous to the light concentrating elements 229, 239 and 249. The waveguide 255 includes a core 258 and cladding 256 analogous to the core and cladding, respectively, of the waveguides 205, 215, 225, 235 and 245. The light concentrating element 259 is separated from the waveguide 255 by a gap 253. The structure and function of the components 252, 254, 255 and 259 is analogous to that of the components 202/212/222/232/242, 204/214/224/234/244, 205/215/225/235/245, and 229/239/249.

The antireflective mechanism 254 is located within the waveguide 255 and is analogous to the antireflective mechanisms 204, 214, 224, 234, 244 and 150. In this case, however, the antireflective mechanism is at the within the waveguide 255. The thickness, t3, of the antireflective mechanism 254 is selected to provide for destructive interference. The antireflective mechanism is located a distance l3 from the interface 251 and is recessed from the interface of the waveguide core 258 with the gap 253. In this location, the antireflective mechanism 254 may account for reflections at the interface 251 (between the light concentrating element 259 and the NFT 252) and for reflections between the waveguide 255 and the light concentrating element 259.

The HAMR write apparatus 250 may have improved performance. Through the use of the antireflective trench 254, optical coupling may be improved without adversely affecting stability and performance of other components, such as the laser. Thus, performance, reliability and lifetime of the HAMR write apparatus 260 may be improved.

Figure 8:
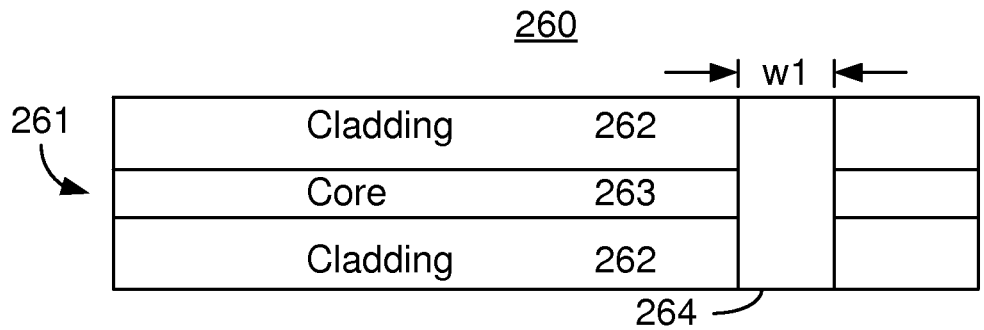
FIG. 8 is a side view depicting a portion of another exemplary embodiment of a HAMR write apparatus including a waveguide and an antireflective mechanism.

FIG. 8 is a side view depicting a portion of an exemplary embodiment of a HAMR write apparatus 260 including a waveguide 261 and an antireflective mechanism 264. The HAMR write apparatus 260 is analogous to the HAMR transducer 130 and HAMR write apparatus 200, 210, 220, 230, 240 and 250. The HAMR write apparatus 260 may reside in a disk drive analogous to the disk drive 100. For clarity, FIG. 8 is not to scale. In addition, for simplicity, the antireflective mechanism 264 is depicted in the waveguide 261. However, in alternate embodiments, the antireflective mechanism may be located elsewhere, as discussed with respect to FIGS. 2A-7B. The waveguide 261 includes a core 263 and cladding 262 analogous to the core and cladding, respectively, of the waveguides 205, 215, 225, 235, 245 and 255. The waveguide 261 may be optically coupled with an NFT (not shown) in a direct fire configuration.

The antireflective mechanism 264 is a dielectric trench 264. Thus, portions of both the core 263 and cladding 262 of the waveguide 261 may be removed to form the dielectric trench 264. The dielectric trench 264 has a thickness, w1, in the transmission direction (along the direction of the core 263). The thickness along the transmission direction, w1, is selected to reduce reflections in a reflection direction opposite to the transmission direction. The thickness of the dielectric trench 264 may be one-fourth of the wavelength plus an integral number of one-half wavelengths, where the wavelength is the wavelength in the dielectric trench 264. The dielectric used for the dielectric trench 264 may have a high index of refraction as compared with the remainder of the waveguide 265. Thus, the dielectric trench 264 may have an index of refraction that is not less than the index of refraction of the core 263. Materials that might be used for the dielectric trench 204 include but are not limited to titanium dioxide, strontium titanate, lead titanate, silicon carbide, gallium arsenide, tantalum oxide, silicon oxide and silicon carbide. Reflected light from the NFT (not shown) or other interfaces may undergo destructive interference in the dielectric trench 264. Thus, reflected light reaching the laser may be reduced or eliminated. Through the use of the antireflective trench 264, optical coupling may be improved without adversely affecting stability and performance of other components, such as the laser. Thus, performance, reliability and lifetime of the HAMR write apparatus 260 may be improved.

Figure 9:
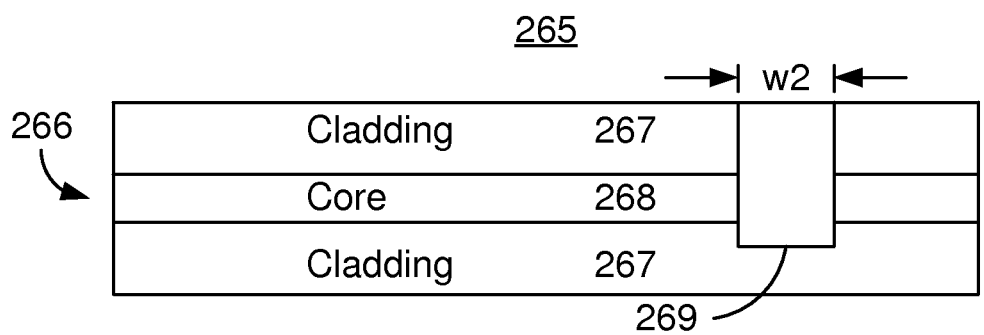
FIG. 9 is a side view depicting a portion of another exemplary embodiment of a HAMR write apparatus including a waveguide and an antireflective mechanism.

FIG. 9 is a side view depicting a portion of an exemplary embodiment of a HAMR write apparatus 265 including a waveguide 266 and an antireflective mechanism 269. The HAMR write apparatus 265 is analogous to the HAMR transducer 130 and HAMR write apparatus 200, 210, 220, 230, 240, 250 and 260. The HAMR write apparatus 265 may reside in a disk drive analogous to the disk drive 100. For clarity, FIG. 9 is not to scale. In addition, for simplicity, the antireflective mechanism 269 is depicted in the waveguide 266. However, in alternate embodiments, the antireflective mechanism may be located elsewhere, as discussed with respect to FIGS. 2A-7B. The waveguide 266 includes a core 268 and cladding 267 analogous to the core and cladding, respectively, of the waveguides 205, 215, 225, 235, 245, 255 and 261. The waveguide 266 may be optically coupled with an NFT (not shown) in a direct fire configuration.

The antireflective mechanism 269 is a dielectric trench 269. Thus, portions of both the core 263 and cladding 262 of the waveguide 261 may be removed to form the dielectric trench 264. However, in contrast to the antireflective trench 264 depicted in FIG. 8, the dielectric trench 269 does not extend through the entire waveguide 266. Instead, the dielectric trench 269 extends only through the top cladding layer 267 and the core 268. The dielectric trench 269 may extend only partially through the bottom cladding layer 267. The dielectric trench 269 has a thickness, w2, in the transmission direction that is selected to reduce reflections in a reflection direction opposite to the transmission direction. The thickness of the dielectric trench 269 may be one-fourth of the wavelength plus an integral number of one-half wavelengths. The dielectric used for the dielectric trench 269 may be analogous to the dielectric discussed above. Reflected light from the NFT (not shown) or other interfaces may undergo destructive interference in the dielectric trench 269. Thus, reflected light reaching the laser may be reduced or eliminated. Through the use of the antireflective trench 269, optical coupling may be improved without adversely affecting stability and performance of other components, such as the laser. Thus, performance, reliability and lifetime of the HAMR write apparatus 250 may be improved.

Figure 10:
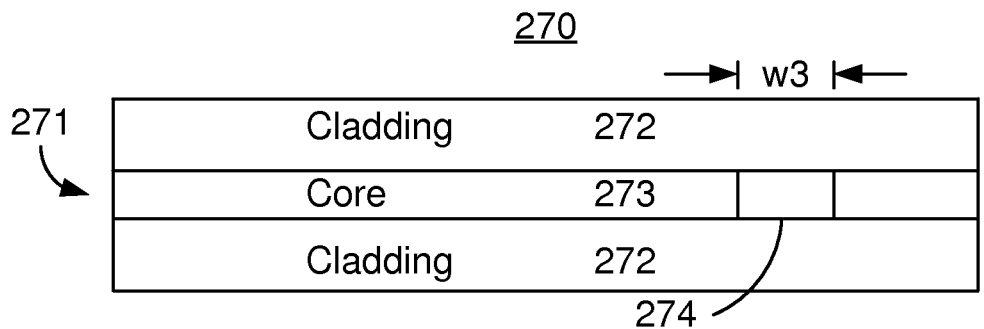
FIG. 10 is a side view depicting a portion of another exemplary embodiment of a HAMR write apparatus including a waveguide and an antireflective mechanism.

FIG. 10 is a side view depicting a portion of an exemplary embodiment of a HAMR write apparatus 270 including a waveguide 271 and an antireflective mechanism 274. The HAMR write apparatus 270 is analogous to the HAMR transducer 130 and HAMR write apparatus 200, 210, 220, 230, 240, 250, 260 and 265. The HAMR write apparatus 270 may reside in a disk drive analogous to the disk drive 100. For clarity, FIG. 10 is not to scale. In addition, for simplicity, the antireflective mechanism 274 is depicted in the waveguide 271. However, in alternate embodiments, the antireflective mechanism may be located elsewhere, as discussed with respect to FIGS. 2A-7B. The waveguide 271 includes a core 273 and cladding 272 analogous to the core and cladding, respectively, of the waveguides 205, 215, 225, 235, 245, 255, 260 and 265. The waveguide 271 may be optically coupled with an NFT (not shown) in a direct fire configuration.

The antireflective mechanism 274 is a dielectric trench 274 having a thickness, w3, in the transmission direction (along the direction of the core 263). However, in the embodiment shown, the dielectric trench 274 is formed only in the core 273. The thickness along the transmission direction, w3, is selected to reduce reflections in a reflection direction opposite to the transmission direction, as discussed above. Materials that might be used for the dielectric trench 274 are also analogous to those discussed above. Reflected light from the NFT (not shown) or other interfaces may undergo destructive interference in the dielectric trench 274. Thus, reflected light reaching the laser may be reduced or eliminated. Through the use of the antireflective trench 274, optical coupling may be improved without adversely affecting stability and performance of other components, such as the laser. Thus, performance, reliability and lifetime of the HAMR write apparatus 270 may be improved.

Figure 11:
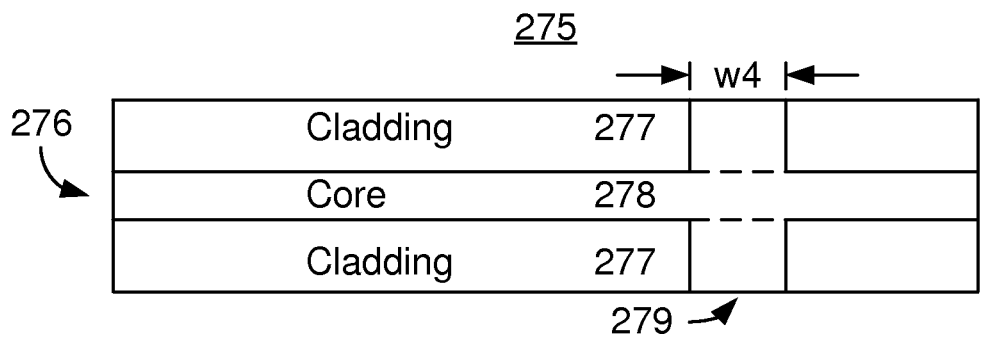
FIG. 11 is a side view depicting a portion of another exemplary embodiment of a HAMR write apparatus including a waveguide and an antireflective mechanism.

FIG. 11 is a side view depicting a portion of an exemplary embodiment of a HAMR write apparatus 275 including a waveguide 276 and an antireflective mechanism 279. The HAMR write apparatus 275 is analogous to the HAMR transducer 130 and HAMR write apparatus 200, 210, 220, 230, 240, 250, 260, 265 and 270. The HAMR write apparatus 275 may reside in a disk drive analogous to the disk drive 100. For clarity, FIG. 11 is not to scale. In addition, for simplicity, the antireflective mechanism 279 is depicted in the waveguide 266. However, in alternate embodiments, the antireflective mechanism may be located elsewhere, as discussed with respect to FIGS. 2A-7B. The waveguide 276 includes a core 278 and cladding 277 analogous to the core and cladding, respectively, of the waveguides 205, 215, 225, 235, 245, 255, 261, 266 and 271. The waveguide 276 may be optically coupled with an NFT (not shown) in a direct fire configuration.

The antireflective mechanism 279 is a dielectric trench 279. However, the dielectric trench 279 may also be viewed as an extension of the core 278. Thus, the core material, or another dielectric having analogous characteristics extends into the upper and/or lower cladding layers 277. However, for simplicity, the antireflective mechanism is still termed a dielectric trench. The dielectric trench 279 has a thickness, w4, in the transmission direction that is selected to reduce reflections in a reflection direction opposite to the transmission direction. The thickness of the dielectric trench 279 may be one-fourth of the wavelength plus an integral number of one-half wavelengths. Reflected light from the NFT (not shown) or other interfaces may undergo destructive interference in the dielectric trench 279. Thus, reflected light reaching the laser may be reduced or eliminated. Through the use of the antireflective trench 279, optical coupling may be improved without adversely affecting stability and performance of other components, such as the laser. Thus, performance, reliability and lifetime of the HAMR write apparatus 270 may be improved.

Figure 12:
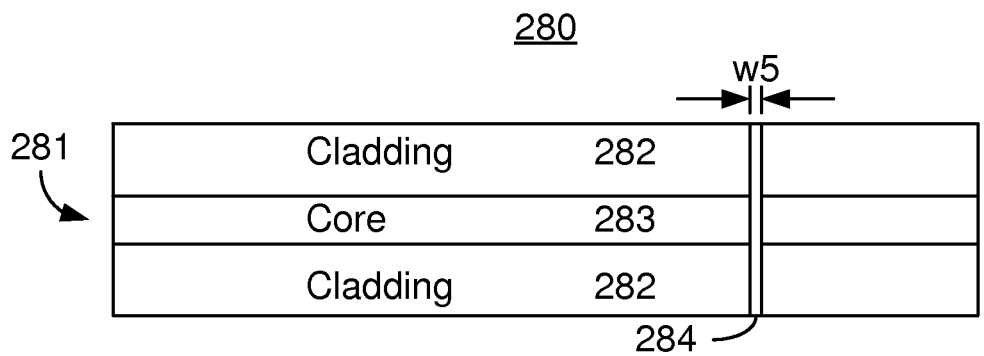
FIG. 12 is a side view depicting a portion of another exemplary embodiment of a HAMR write apparatus including a waveguide and an antireflective mechanism.

FIG. 12 is a side view depicting a portion of an exemplary embodiment of a HAMR write apparatus 280 including a waveguide 281 and an antireflective mechanism 284. The HAMR write apparatus 280 is analogous to the HAMR transducer 130 and HAMR write apparatus 200, 210, 220, 230, 240, 250, 260, 265, 270 and 275. The HAMR write apparatus 280 may reside in a disk drive analogous to the disk drive 100. For clarity, FIG. 12 is not to scale. In addition, for simplicity, the antireflective mechanism 284 is depicted in the waveguide 281. However, in alternate embodiments, the antireflective mechanism may be located elsewhere, as discussed with respect to FIGS. 2A-7B. The waveguide 281 includes a core 283 and cladding 282 analogous to the core and cladding, respectively, of the waveguides 205, 215, 225, 235, 245, 255, 260, 265, 270 and 275. The waveguide 281 may be optically coupled with an NFT (not shown) in a direct fire configuration.

The antireflective mechanism 284 is metal trench 284 having a thickness, w5, in the transmission direction. The thickness along the transmission direction, w5, is selected to reduce reflections in a reflection direction opposite to the transmission direction. For example, the thickness may be not more than one and one half of the skin depth of the metal used in the metal trench 284. Materials that might be used for the metal trench 284 are also analogous to those discussed above, such as gold, chromium and titanium. Reflected light from the NFT (not shown) or other interfaces may undergo destructive interference in the metal trench 284. Thus, reflected light reaching the laser may be reduced or eliminated. Through the use of the antireflective trench 284, optical coupling may be improved without adversely affecting stability and performance of other components, such as the laser. Thus, performance, reliability and lifetime of the HAMR write apparatus 280 may be improved.

Figure 13:
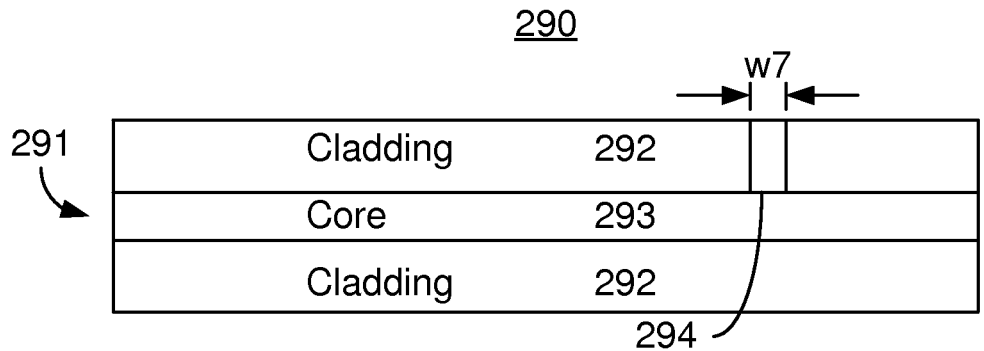
FIG. 13 is a side view depicting a portion of another exemplary embodiment of a HAMR write apparatus including a waveguide and an antireflective mechanism.
Figure 14:
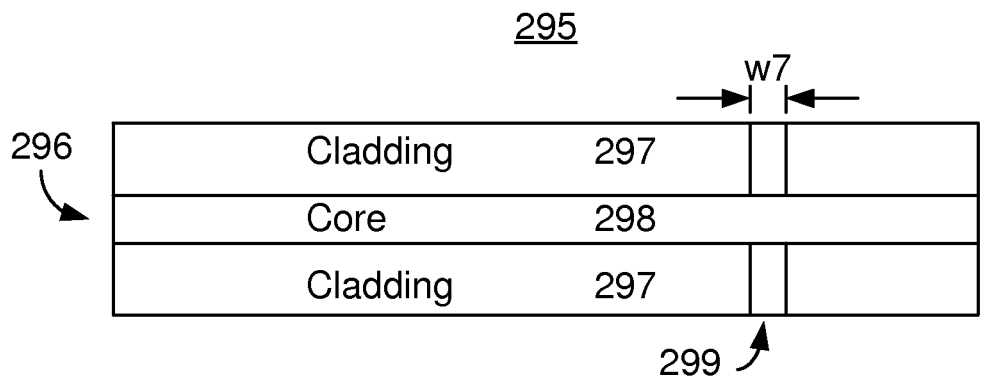
FIG. 14 is a side view depicting a portion of another exemplary embodiment of a HAMR write apparatus including a waveguide and an antireflective mechanism.

FIGS. 13 and 14 are side views depicting a portion of an exemplary embodiment of HAMR write apparatuses 290 and 295. The apparatuses 290 and 295 include a waveguide 291 and 296, respectively, and an antireflective mechanism 294 and 299, respectively. The HAMR write apparatuses 290 and 295 are each analogous to the HAMR transducer 130 and HAMR write apparatus 200, 210, 220, 230, 240, 250, 260, 265, 270, 275, 280, and 285. The HAMR write apparatuses 290 and 295 may reside in a disk drive analogous to the disk drive 100. For clarity, FIGS. 13 and 14 are not to scale. In addition, for simplicity, the antireflective mechanisms 294 and 299 are depicted in the waveguide 291 and 296, respectively. In the embodiment shown, the antireflective mechanism is at the interface closest to the laser (not shown). However, in alternate embodiments, the antireflective mechanisms may be located elsewhere, as discussed with respect to FIGS. 2A-7B. The waveguides 291 and 296 includes a core 293 and 298, respectively, and cladding 292 and 297, respectively, that analogous to the core and cladding, respectively, of the waveguides 205, 215, 225, 235, 245, 255, 261, 266, 271, 276, 281 and 286. The waveguides 291 and 296 may be optically coupled with an NFT (not shown) in a direct fire configuration.

The antireflective mechanisms 294 and 299 are each a metal trench. However, the metal trenches 294 and 299 do not extend through the core 293 or 298. Instead, the metal trenches 294 and 299 may be seen as inclusions in the cladding 292 and 297. The metal trenches 294 and 299 each has a thickness, w7, in the transmission direction that is selected to reduce reflections in a reflection direction opposite to the transmission direction. The thickness of the metal trenches 294 and 299 may be not more than one and one half the skin depth of the metal in the trenches 294 and 299. Reflected light from the NFT (not shown) or other interfaces may undergo destructive interference in the metal trench 294 or 299. Thus, reflected light reaching the laser may be reduced or eliminated. Through the use of the antireflective trench 294 and/or 299, optical coupling may be improved without adversely affecting stability and performance of other components, such as the laser. Thus, performance, reliability and lifetime of the HAMR write apparatus 290 and 299 may be improved.

Figure 15:
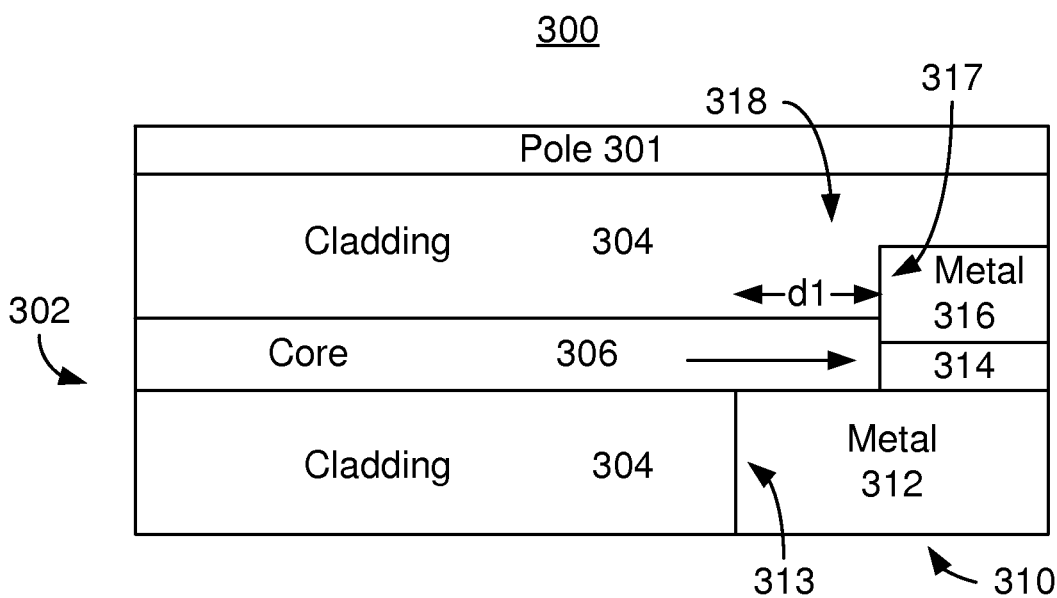
FIG. 15 is a side view depicting a portion of another exemplary embodiment of a HAMR write apparatus including a waveguide, an antireflective mechanism and an NFT.

FIG. 15 is a side view depicting a portion of an exemplary embodiment of a HAMR write apparatus 300 including an NFT 310, an antireflective mechanism 318 and a waveguide 302. The HAMR write apparatus 300 may be analogous to the HAMR transducer 130 and may reside in a disk drive analogous to the disk drive 100. For clarity, FIG. 15 is not to scale. The waveguide 302 is analogous to the waveguides described previously. The waveguide 302 includes a core 306 and cladding 304. Also shown is pole 301. As discussed above, light from the laser (not shown in FIG. 15) is concentrated in the core 306 of the waveguide 302. The light propagates through the waveguide 302 toward the NFT 310 in a direction of transmission shown by the arrow in the core 306. Although shown as a straight waveguide with only some tapering, in other embodiments, the waveguide 302 may have another geometry including but not limited to a curved path and/or other tapers.

The NFT 310 is in the direct fire configuration. Thus, the NFT 310 is aligned with the core 306 of the waveguide 302. In addition, the NFT 310 is a metal-insulator-metal (MIM) NFT. The insulating layer 314 lies between the metal layers 312 and 316 of the NFT 310 in a deposition direction. Stated differently, the metal layer 312 may be deposited first, follows by the insulating layer 314 and then the metal layer 316. Plasmons in the NFT 310 may be excited by the energy carried by the core 306.

The metal layers 312 and 316 have entrance surfaces (or interfaces with the waveguide 302) 313 and 317, respectively. As can be seen in FIG. 15, these entrance surfaces 313 and 317 are offset in the direction of transmission. The distance, d1, that these entrance surfaces 313 and 317 are offset is generally greater than one quarter of a wavelength. The distance d1 is selected such that destructive interference may occur for light reflected off of the surfaces 313 and 317 because of their difference in phase/path. The value of the distance d1 may depend upon factors such as propagation speed of plasmons for the NFT 310 and the wavelength (index of refraction) of the waveguide 302.

In operation, light from the laser (not shown) travels through the waveguide 302 in the transmission direction and is coupled into the NFT 310. Writing may take place as described above. Light reflected at the interfaces 313 and 317 of the NFT 310 travels in the opposite direction. Because of the offset d1 that forms the antireflective mechanism 318, the light reflected from the interfaces 313 and 317 undergoes destructive interference. Thus, reflected light reaching the laser may be reduced or eliminated. Further, the offset may move the peak of the energy coupled from the NFT 310 to the media (not shown) closer to the pole 301, which is desirable. The HAMR write apparatus 300 may have improved performance because optical coupling may be improved without adversely affecting stability and performance of other components, such as the laser.

Figure 16:
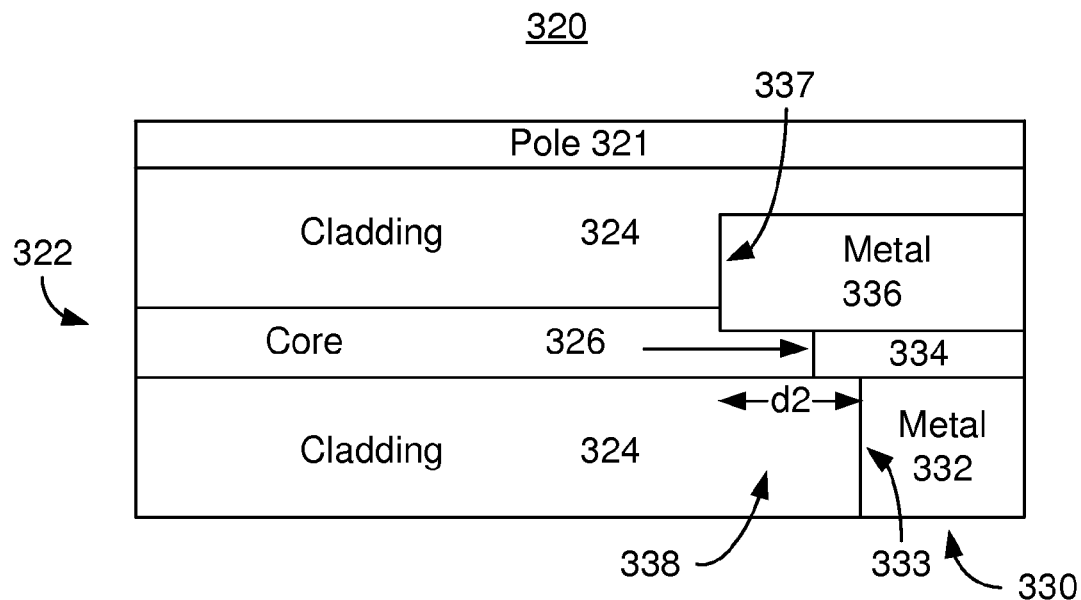
FIG. 16 is a side view depicting a portion of another exemplary embodiment of a HAMR write apparatus including a waveguide, an antireflective mechanism and an NFT.

FIG. 16 is a side view depicting a portion of an exemplary embodiment of a HAMR write apparatus 320 including an NFT 330, an antireflective mechanism 338 and a waveguide 322. The HAMR write apparatus 320 may be analogous to the HAMR transducer 130 and may reside in a disk drive analogous to the disk drive 100. For clarity, FIG. 16 is not to scale. The waveguide 322 is analogous to the waveguides described previously. The waveguide 322 includes a core 326 and cladding 324. Also shown is pole 321. As discussed above, light from the laser (not shown in FIG. 16) is concentrated in the core 326 of the waveguide 322. The light propagates through the waveguide 322 toward the NFT 330 in a direction of transmission shown by the arrow in the core 326. Although shown as a straight waveguide with only some tapering, in other embodiments, the waveguide 322 may have another geometry including but not limited to a curved path and/or other tapers.

The NFT 330 is in the direct fire configuration and, like the NFT 310, is a MIM including metal layers 332 and 336 separated by insulating layer 334. The insulating layer 334 lies between the metal layers 332 and 336 of the NFT 330 in a deposition direction. Thus, the metal layer 332 may be deposited first, follows by the insulating layer 334 and then the metal layer 336. Plasmons in the NFT 330 may be excited by the energy carried by the core 326. The metal layers 332 and 336 have entrance surfaces 333 and 337, respectively, that are offset in the direction of transmission. The distance, d2, that these entrance surfaces 333 and 337 are offset is generally greater than one quarter of a wavelength. The distance d2 is selected such that destructive interference may occur for light reflected off of the surfaces 333 and 337 because of their difference in phase/path as described above. Further, the entrance of the core 334 is offset from the entrance surfaces 337 and 333. Because of the offset d2, the light reflected from the interfaces 333 and 337 undergoes destructive interference. Thus, reflected light reaching the laser may be reduced or eliminated. Further, the offset may move the peak of the energy coupled from the NFT 330 to the media (not shown) closer to the pole 321, which is desirable. The HAMR write apparatus 320 may have improved performance because optical coupling may be improved without adversely affecting stability and performance of other components, such as the laser.

Figure 17:
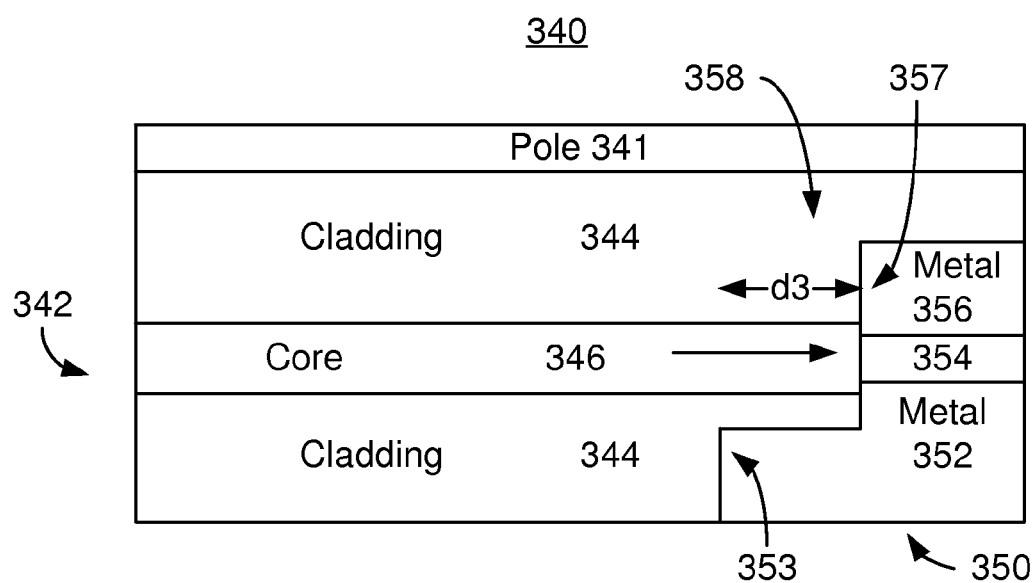
FIG. 17 is a side view depicting a portion of another exemplary embodiment of a HAMR write apparatus including a waveguide, an antireflective mechanism and an NFT.

FIG. 17 is a side view depicting a portion of an exemplary embodiment of a HAMR write apparatus 340 including an NFT 350, an antireflective mechanism 358 and a waveguide 342. The HAMR write apparatus 340 may be analogous to the HAMR transducer 130 and may reside in a disk drive analogous to the disk drive 100. For clarity, FIG. 17 is not to scale. The waveguide 342 is analogous to the waveguides described previously. The waveguide 342 includes a core 346 and cladding 344. Also shown is pole 341. As discussed above, light from the laser (not shown in FIG. 17) is concentrated in the core 346 of the waveguide 342. The light propagates through the waveguide 342 toward the NFT 350 in a direction of transmission shown by the arrow in the core 356. Although shown as a straight waveguide with only some tapering, in other embodiments, the waveguide 342 may have another geometry including but not limited to a curved path and/or other tapers.

The NFT 350 is in the direct fire configuration and, like the NFTs 310 and 330, is a MIM including metal layers 352 and 356 separated by insulating layer 354. The metal layers 352 and 356 have entrance surfaces 353 and 357, respectively, that are offset in the direction of transmission. Note, however, that only a portion of the surface 353 is offset from the surface 357. The portion closest to each insulating layer 354 is aligned with the surface 357. The distance, d3, that these entrance surfaces 353 and 357 are offset is generally greater than one quarter of a wavelength and selected such that destructive interference may occur for light reflected off of the surfaces 353 and 357 because of their difference in phase/path as described above. Because of the offset d3, the light reflected from the interfaces 353 and 357 undergoes destructive interference. Thus, reflected light reaching the laser may be reduced or eliminated. Further, the offset may move the peak of the energy coupled from the NFT 350 to the media (not shown) closer to the pole 341, which is desirable. The HAMR write apparatus 340 may have improved performance because optical coupling may be improved without adversely affecting stability and performance of other components, such as the laser.

Figure 18:
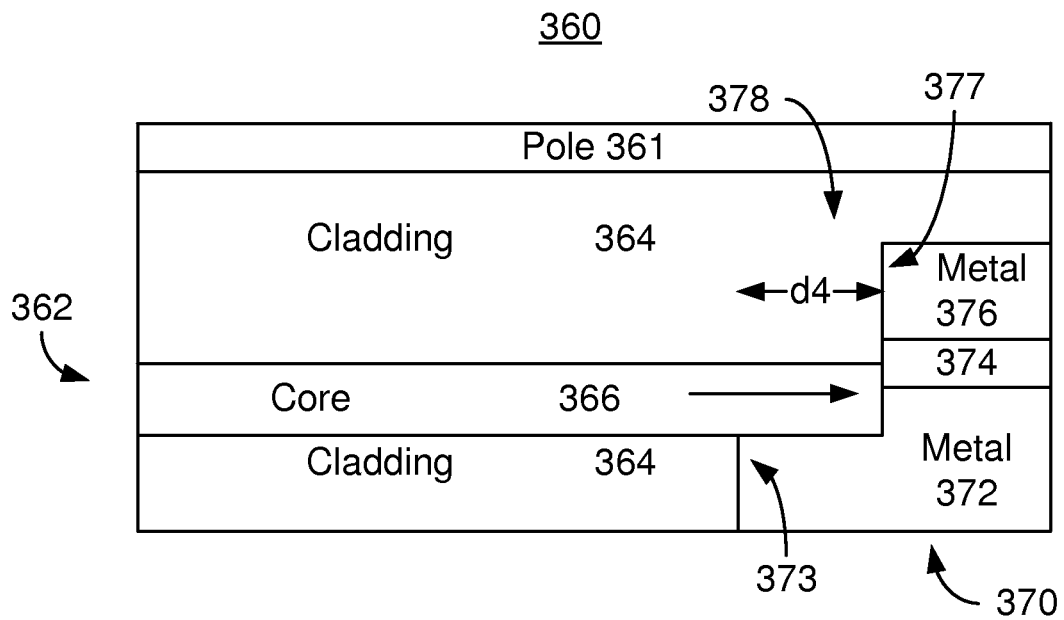
FIG. 18 is a side view depicting a portion of another exemplary embodiment of a HAMR write apparatus including a waveguide, an antireflective mechanism and an NFT.

FIG. 18 is a side view depicting a portion of an exemplary embodiment of a HAMR write apparatus 360 including an NFT 370, an antireflective mechanism 378 and a waveguide 362. The HAMR write apparatus 360 may be analogous to the HAMR transducer 130 and may reside in a disk drive analogous to the disk drive 100. For clarity, FIG. 18 is not to scale. The waveguide 362 is analogous to the waveguides described previously and includes a core 366 and cladding 364. Also shown is pole 361. As discussed above, light from the laser (not shown in FIG. 18) is concentrated in the core 366 of the waveguide 362. The light propagates through the waveguide 362 toward the NFT 370 in a direction of transmission shown by the arrow in the core 366. Although shown as a straight waveguide with only some tapering, in other embodiments, the waveguide 362 may have another geometry including but not limited to a curved path and/or other tapers.

The NFT 370 is in the direct fire configuration and, like the NFTs 310, 330 and 350, is a MIM including metal layers 372 and 376 separated by insulating layer 374. The metal layers 372 and 376 have entrance surfaces 373 and 377, respectively, that are offset in the direction of transmission as discussed above. Note, however, that only a portion of the surface 373 is offset from the surface 377. In addition, the core of the waveguide 266 is offset from the insulating layer 274. The distance, d4, that these entrance surfaces 373 and 377 are offset analogous to that described above. Thus, reflected light reaching the laser may be reduced or eliminated. Further, the offset may move the peak of the energy coupled from the NFT 370 to the media (not shown) closer to the pole 361, which is desirable. The HAMR write apparatus 360 may have improved performance because optical coupling may be improved without adversely affecting stability and performance of other components, such as the laser.

Figure 19:
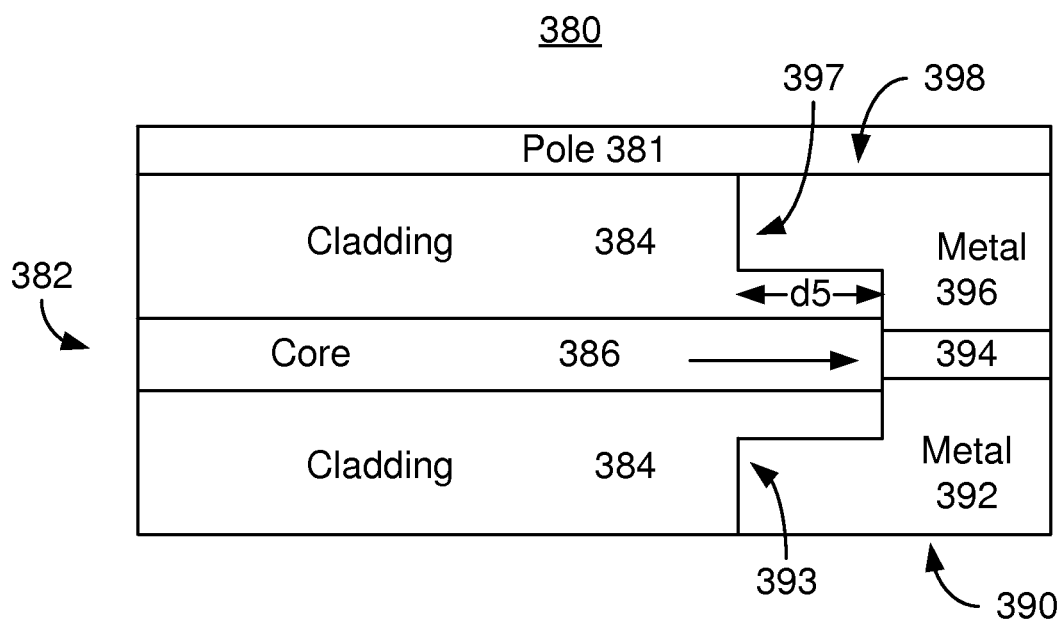
FIG. 19 is a side view depicting a portion of another exemplary embodiment of a HAMR write apparatus including a waveguide, an antireflective mechanism and an NFT.

FIG. 19 is a side view depicting a portion of an exemplary embodiment of a HAMR write apparatus 380 including an NFT 390, an antireflective mechanism 398 and a waveguide 382. The HAMR write apparatus 380 may be analogous to the HAMR transducer 130 and may reside in a disk drive analogous to the disk drive 100. For clarity, FIG. 19 is not to scale. The waveguide 382 is analogous to the waveguides described previously and includes a core 386 and cladding 384. Also shown is pole 381. As discussed above, light from the laser (not shown in FIG. 19) is concentrated in the core 386 of the waveguide 382. The light propagates through the waveguide 382 toward the NFT 390 in a direction of transmission shown by the arrow in the core 386. Although shown as a straight waveguide with only some tapering, in other embodiments, the waveguide 382 may have another geometry including but not limited to a curved path and/or other tapers.

The NFT 390 is in the direct fire configuration and, like the NFTs 310, 330, 350 and 370, is a MIM including metal layers 392 and 396 separated by insulating layer 394. The metal layers 392 and 396 have entrance surfaces 393 and 397, respectively, that are offset in the direction of transmission as discussed above. Note, however, that only a portion of the surface 393 is offset from a portion of the surface 397. The distance, d5, that these entrance surfaces 393 and 397 are offset analogous to that described above. Thus, reflected light reaching the laser may be reduced or eliminated. Further, the offset may move the peak of the energy coupled from the NFT 390 to the media (not shown) closer to the pole 361, which is desirable. The HAMR write apparatus 380 may have improved performance because optical coupling may be improved without adversely affecting stability and performance of other components, such as the laser.

Figure 20:
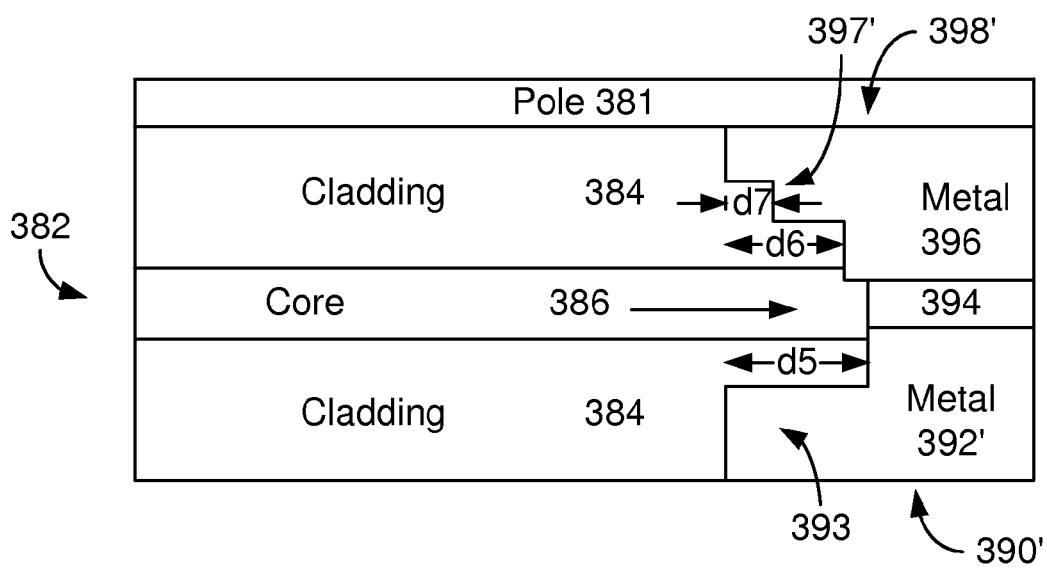
FIG. 20 is a side view depicting a portion of another exemplary embodiment of a HAMR write apparatus including a waveguide, an antireflective mechanism and an NFT.

FIG. 20 is a side view depicting a portion of an exemplary embodiment of a HAMR write apparatus 380' including an NFT 390', an antireflective mechanism 398' and a waveguide 382. The HAMR write apparatus 380' may be analogous to the HAMR transducer 130 and may reside in a disk drive analogous to the disk drive 100. For clarity, FIG. 20 is not to scale. The waveguide 382 is analogous to the waveguides described previously and includes a core 386 and cladding 384. Also shown is pole 381. As discussed above, light from the laser (not shown in FIG. 20) is concentrated in the core 386 of the waveguide 382. The light propagates through the waveguide 382 toward the NFT 390' in a direction of transmission shown by the arrow in the core 386. Although shown as a straight waveguide with only some tapering, in other embodiments, the waveguide 382 may have another geometry including but not limited to a curved path and/or other tapers.

The NFT 390' is in the direct fire configuration and, like the NFTs 310, 330, 350 and 370, is a MIM including metal layers 392 and 396' separated by insulating layer 394. The metal layers 392 and 396' have entrance surfaces 393 and 397', respectively, that are offset in the direction of transmission as discussed above. Portions of the surface 397' are offset from portions of the surface 393 by different distances.

The distance, d5, still offsets portions of the surface 393 of the metal layer 392. However, the metal layer 396' has two steps. Thus, portions of the surface 397' are offset by distances d6 and d7. The surfaces 393 and 397' are different in the embodiment shown. In other embodiments, the surfaces 393 and 397' may be the same. For example, both surfaces may have multiple steps as the surface 397'. Alternatively, both surfaces might have only a single step but of different heights. Because of these offsets, the antireflective mechanism 398' may reduce or eliminate the reflected light reaching the laser. Further, the offset may move the peak of the energy coupled from the NFT 390 to the media (not shown) closer to the pole 361, which is desirable. The HAMR write apparatus 380 may have improved performance because optical coupling may be improved without adversely affecting stability and performance of other components, such as the laser.

Figure 21:
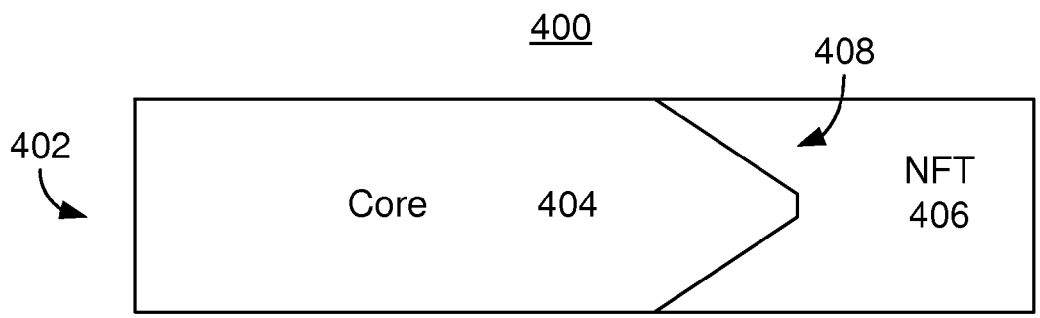
FIG. 21 is a plan view depicting a portion of another exemplary embodiment of a HAMR write apparatus including a waveguide and an NFT.

FIG. 21 is a plan view depicting a portion of an exemplary embodiment of a HAMR write apparatus 400 including an NFT 406, an antireflective mechanism 408 and a waveguide 402 of which only the core 404 is shown. The HAMR write apparatus 400 may be analogous to the HAMR transducer 130 and may reside in a disk drive analogous to the disk drive 100. For clarity, FIG. 21 is not to scale. The waveguide 402 is analogous to the waveguides described previously. Although shown as a straight waveguide with only some tapering, in other embodiments, the waveguide 402 may have another geometry including but not limited to a curved path and/or other tapers. The NFT 406 is in the direct fire configuration and, like the NFTs 310, 330, 350, 370 and 390, is a MIM including metal layers (not separately shown) separated by insulating layer (not shown). The metal layers of the NFT 406 have entrance surfaces 408 that are at a nonzero, acute angle from the transmission direction. The entrance surfaces 408 thus form the antireflective mechanism 408. In the embodiment shown in FIG. 21, the surfaces 408 are configured to form a V-shape, which aids in reducing reflections for reasons analogous to those described above. Thus, reflected light reaching the laser may be reduced or eliminated. In addition, coupling into the NFT 406 may be improved. The HAMR write apparatus 400 may have improved performance because optical coupling may be improved without adversely affecting stability and performance of other components, such as the laser.

Figure 22:
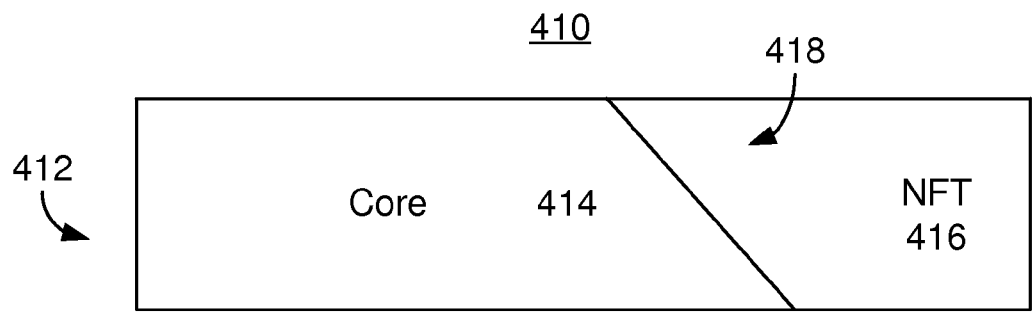
FIG. 22 is a plan view depicting a portion of another exemplary embodiment of a HAMR write apparatus including a waveguide and an NFT.

FIG. 22 is a plan view depicting a portion of an exemplary embodiment of a HAMR write apparatus 410 including an NFT 416, an antireflective mechanism 418 and a waveguide 412 of which only the core 414 is shown. The HAMR write apparatus 410 may be analogous to the HAMR transducer 130 and may reside in a disk drive analogous to the disk drive 100. For clarity, FIG. 22 is not to scale. The waveguide 412 is analogous to the waveguides described previously. Although shown as a straight waveguide with only some tapering, in other embodiments, the waveguide 412 may have another geometry including but not limited to a curved path and/or other tapers. The NFT 416 is in the direct fire configuration and, like the NFTs 310, 330, 350, 370, 390 and 406, is a MIM including metal layers (not separately shown) separated by insulating layer (not shown). The metal layers of the NFT 416 have entrance surfaces 418 that are at a nonzero, acute angle from the transmission direction. The entrance surfaces 418 thus form the antireflective mechanism 418. In the embodiment shown in FIG. 22, the surfaces are configured to form an angle, which aids in reducing reflections for reasons analogous to those described above. Thus, reflected light reaching the laser may be reduced or eliminated. In addition, coupling into the NFT 416 may be improved. The HAMR write apparatus 410 may have improved performance because optical coupling may be improved without adversely affecting stability and performance of other components, such as the laser.

Figure 23:
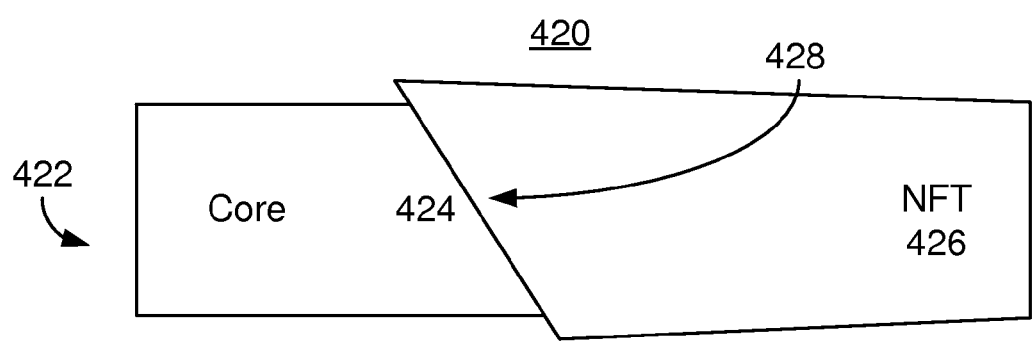
FIG. 23 is a plan view depicting a portion of another exemplary embodiment of a HAMR write apparatus including a waveguide and an NFT.

FIG. 23 is a plan view depicting a portion of an exemplary embodiment of a HAMR write apparatus 420 including an NFT 426, an antireflective mechanism 428 and a waveguide 422 of which only the core 424 is shown. The HAMR write apparatus 420 may be analogous to the HAMR transducer 130 and may reside in a disk drive analogous to the disk drive 100. For clarity, FIG. 23 is not to scale. The waveguide 422 is analogous to the waveguides described previously. Although shown as a straight waveguide with only some tapering, in other embodiments, the waveguide 422 may have another geometry including but not limited to a curved path and/or other tapers. The NFT 426 is in the direct fire configuration and, like the NFTs 310, 330, 350, 370, 390, 406 and 416, is a MIM including metal layers (not separately shown) separated by insulating layer (not shown). The metal layers of the NFT 426 have entrance surfaces 428 that are at a nonzero, acute angle from the transmission direction. The entrance surfaces 428 thus form the antireflective mechanism 428. In addition, the NFT 426 is tapered, such that the entrance surface/antireflective mechanism 428 is wider than the core 424. The configuration of the NFT 426 aids in reducing reflections for reasons analogous to those described above. Thus, reflected light reaching the laser may be reduced or eliminated. In addition, coupling into the NFT 426 may be improved. The HAMR write apparatus 420 may have improved performance because optical coupling may be improved without adversely affecting stability and performance of other components, such as the laser.

Figure 24:
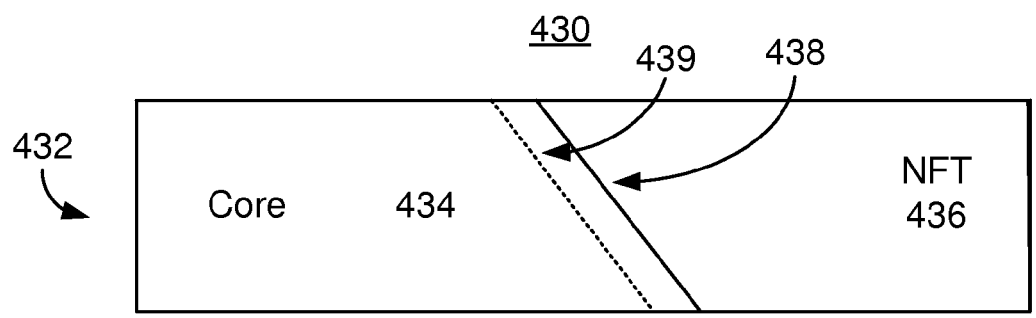
FIG. 24 is a plan view depicting a portion of another exemplary embodiment of a HAMR write apparatus including a waveguide and an NFT.

FIG. 24 is a plan view depicting a portion of an exemplary embodiment of a HAMR write apparatus 430 including an NFT 436, an antireflective mechanism 438/439 and a waveguide 432 of which only the core 434 is shown. The HAMR write apparatus 430 may be analogous to the HAMR transducer 130 and may reside in a disk drive analogous to the disk drive 100. For clarity, FIG. 24 is not to scale. The waveguide 432 is analogous to the waveguides described previously. Although shown as a straight waveguide with only some tapering, in other embodiments, the waveguide 432 may have another geometry including but not limited to a curved path and/or other tapers. The NFT 436 is in the direct fire configuration and, like the NFTs 310, 330, 350, 370, 390, 406, 416 and 426, is a MIM including metal layers separated by an insulating layer (not shown). The metal layers of the NFT 436 have entrance surfaces 438 and 439 that are at a nonzero, acute angle from the transmission direction. In the embodiment shown in FIG. 24, the surfaces are configured to form an angle. In addition, entrance surfaces 438 and 439 of the top and bottom metal layers, respectively, are offset in the transmission direction. The configuration of the NFT 436 aids in reducing reflections for reasons analogous to those described above. Thus, reflected light reaching the laser may be reduced or eliminated. In addition, coupling into the NFT 436 may be improved. The HAMR write apparatus 430 may have improved performance because optical coupling may be improved without adversely affecting stability and performance of other components, such as the laser.

Figure 25:
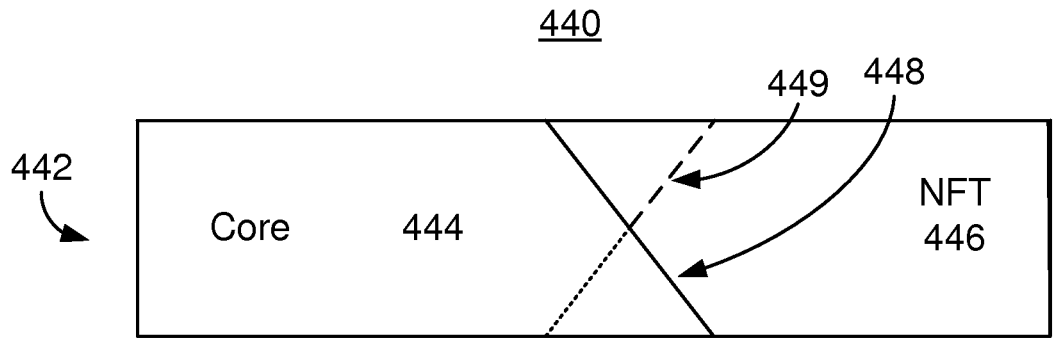
FIG. 25 is a plan view depicting a portion of another exemplary embodiment of a HAMR write apparatus including a waveguide and an NFT.

FIG. 25 is a plan view depicting a portion of an exemplary embodiment of a HAMR write apparatus 440 including an NFT 446, an antireflective mechanism 448/449 and a waveguide 442 of which only the core 444 is shown. The HAMR write apparatus 440 may be analogous to the HAMR transducer 130 and may reside in a disk drive analogous to the disk drive 100. For clarity, FIG. 25 is not to scale. The waveguide 442 is analogous to the waveguides described previously. Although shown as a straight waveguide with only some tapering, in other embodiments, the waveguide 442 may have another geometry including but not limited to a curved path and/or other tapers. The NFT 446 is in the direct fire configuration and, like the NFTs 310, 330, 350, 370, 390, 406, 416, 426 and 436, is a MIM including metal layers separated by an insulating layer (not shown). The metal layers of the NFT 446 have entrance surfaces 448 and 449 that are at a nonzero, acute angle from the transmission direction. In the embodiment shown in FIG. 25, the surfaces are configured to form an angle that are in opposite directions from the transmission direction. In the embodiment shown in FIG. 25, the angles formed by surfaces 448 and 449 are equal in magnitude. In other embodiments, however, these angles may differ in magnitude. Thus, the entrance surfaces 448 and 449 of the top and bottom metal layers, respectively, may be viewed as offset in the transmission direction. The configuration of the NFT 446 aids in reducing reflections for reasons analogous to those described above. Thus, reflected light reaching the laser may be reduced or eliminated. In addition, coupling into the NFT 446 may be improved. The HAMR write apparatus 440 may have improved performance because optical coupling may be improved without adversely affecting stability and performance of other components, such as the laser.

Various HAMR write apparatuses, waveguides, NFTs and antireflective mechanisms having different features highlighted are described herein. One of ordinary skill in the art will recognize that one or more of the features of various embodiments may be combined in manners not inconsistent with the systems and methods described herein.

Figure 26:
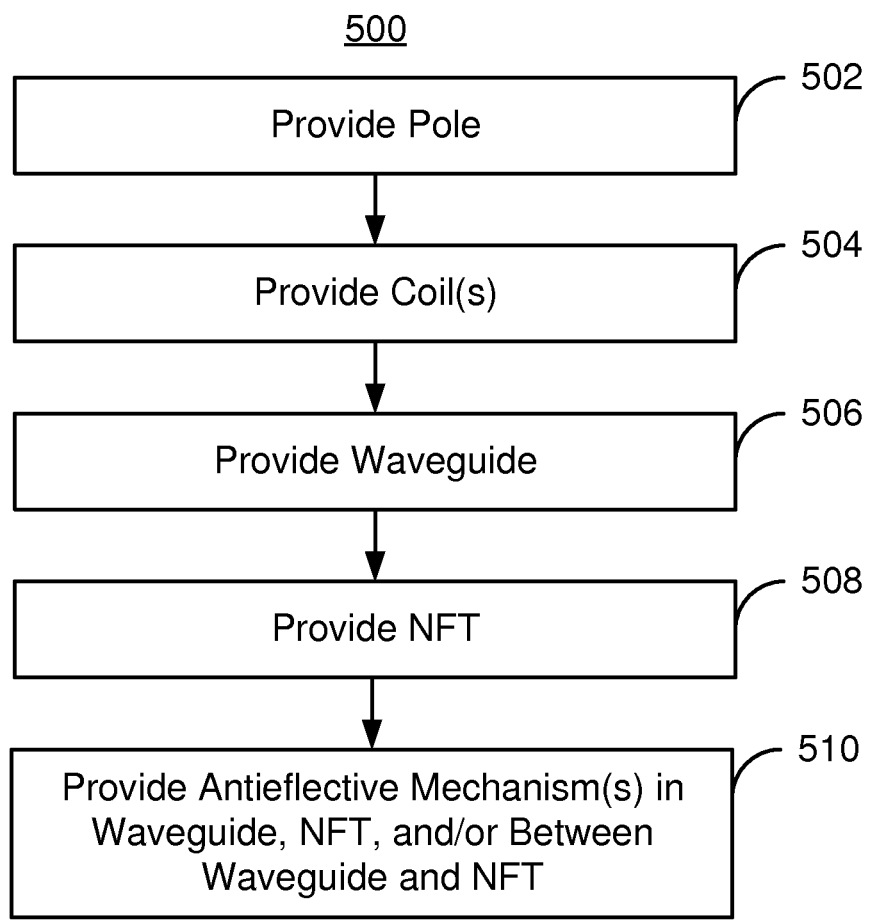
FIG. 26 is a flow chart depicting an exemplary embodiment of a method for fabricating a HAMR write apparatus.

FIG. 26 is a flow chart depicting an exemplary embodiment of a method 500 for fabricating HAMR write apparatus having improved optical efficiency. The method 500 may be used in fabricating a HAMR disk drive 100. For simplicity, some steps may be omitted, performed in another order, interleaved with other steps and/or combined. The method 500 is described in the context of forming a single disk drive 100. However, the method 500 may be used to fabricate multiple disk drives at substantially the same time. The method 500 and system are also described in the context of particular components. However, such components may include multiple sub-components that are also manufactured. Finally, the method 500 may be used to fabricate other HAMR writer apparatuses including but not limited to those described herein.

The write pole 134 is fabricated, via step 502. Step 502 may include forming top and/or bottom bevels in the pole tip and otherwise shaping the main pole. The coil(s) 136 may be provided, via step 504. The waveguide 140 is fabricated, via step 506. Step 506 may include depositing the core layer on a cladding layer, providing a photoresist mask in the desired shape of the core for the waveguide 130, removing the exposed portions of the core and depositing a cladding layer. The NFT 132 may also be provided, via step 508. Fabrication of the transducer may then be completed. The antireflective mechanism 150 may also be provided, via step 510. Step 510 may include incorporating the antireflective mechanism 150 into the waveguide, incorporating the antireflective mechanism 150 into the NFT or forming the antireflective mechanism 150 between the waveguide 140 and the NFT 132.

Thus, using the method 500, the HAMR disk drive 100 may be provided. Similarly, analogous write apparatus 200, 210, 220, 230, 240, 250, 255, 260, 265, 270, 275, 280, 285, 290, 295, 300, 320, 340, 360, 380, 400, 410, 420, 430 and 440. Consequently, the benefits of the HAMR writer(s) 200, 210, 220, 230, 240, 250, 255, 260, 265, 270, 275, 280, 285, 290, 295, 300, 320, 340, 360, 380, 400, 410, 420, 430 and 440 may be achieved.

What is claimed is:

1. A heat assisted magnetic recording (HAMR) write apparatus coupled with a laser for providing energy, the HAMR write apparatus comprising:
   a pole for writing to a region of the media, the pole including a media-facing surface;
   at least one coil for energizing the pole;
   a waveguide optically coupled with the laser and including a core and cladding;
   a near-field transducer (NFT), the waveguide for directing a portion of the energy toward the NFT, the NFT located in a transmission direction from the core of the waveguide; and
   at least one antireflective mechanism residing in at least one of a first position in the waveguide, a second position in the NFT and a third position between the waveguide and the NFT;
   wherein the at least one antireflective mechanism has a location selected from the first position within the waveguide and the third position between the waveguide and the NFT;
   wherein the at least one antireflective mechanism includes a material having a thickness along the transmission direction selected to reduce reflections in a reflection direction opposite to the transmission direction, the material being selected from a high index material and a metal, the high index material having an index of refraction not less than a waveguide core index of refraction, the thickness of the metal being not more than one and one half multiplied by a metal skin depth.

2. The HAMR write apparatus of claim 1 wherein the at least one antireflective mechanism includes at least one antireflective trench.

3. The HAMR write apparatus of claim 2 further comprising:
   a light concentrating element between the waveguide and the NFT, the third position including at least one of a first location within the light concentrating element, a second location between the waveguide and the light concentrating element and a third location between the light concentrating element and the NFT.

4. A heat assisted magnetic recording (HAMR) write apparatus coupled with a laser for providing energy, the HAMR write apparatus comprising:
   a pole for writing to a region of the media, the pole including a media-facing surface;
   at least one coil for energizing the pole;
   a waveguide optically coupled with the laser and including a core and cladding;
   a near-field transducer (NFT), the waveguide for directing a portion of the energy toward the NFT, the NFT located in a transmission direction from the core of the waveguide; and
   at least one antireflective mechanism residing in at least one of a first position in the waveguide, a second position in the NFT and a third position between the waveguide and the NFT, the at least one antireflective mechanism having a location selected from the first position within the waveguide and the third position between the waveguide and the NFT, the at least one antireflective mechanism including a material having a thickness along the transmission direction selected to reduce reflections in a reflection direction opposite to the transmission direction;

wherein the energy has a wavelength at the location and wherein the thickness is one-fourth of the wavelength plus an integral number of one-half wavelengths.

5. The HAMR write apparatus of claim 1 wherein the material is selected from titanium dioxide, strontium titanate, lead titanate, silicon carbide, gallium arsenide, tantalum oxide, silicon oxide, silicon carbide, gold, chromium and titanium.

6. A heat assisted magnetic recording (HAMR) write apparatus coupled with a laser for providing energy, the HAMR write apparatus comprising:
 a pole for writing to a region of the media, the pole including a media-facing surface;
 at least one coil for energizing the pole;
 a waveguide optically coupled with the laser and including a core and cladding;
 a near-field transducer (NFT), the waveguide for directing a portion of the energy toward the NFT, the NFT located in a transmission direction from the core of the waveguide; and
 at least one antireflective mechanism residing in at least one of a first position in the waveguide, a second position in the NFT and a third position between the waveguide and the NFT, the at least one antireflective mechanism having a location selected from the first position within the waveguide and the third position between the waveguide and the NFT;
 wherein the NFT has an entrance surface for receiving the energy from the waveguide, wherein the energy has a wavelength during transmission and wherein the at least one antireflective trench is not more than ten wavelengths from the entrance surface of the NFT.

7. The HAMR write apparatus of claim 6 wherein the at least one antireflective mechanism is not less than two wavelengths from the entrance surface of the NFT.

8. A heat assisted magnetic recording (HAMR) write apparatus coupled with a laser for providing energy, the HAMR write apparatus comprising:
 a pole for writing to a region of the media, the pole including a media-facing surface;
 at least one coil for energizing the pole;
 a waveguide optically coupled with the laser and including a core and cladding;
 a near-field transducer (NFT), the waveguide for directing a portion of the energy toward the NFT, the NFT located in a transmission direction from the core of the waveguide; and
 at least one antireflective mechanism residing in at least one of a first position in the waveguide, a second position in the NFT and a third position between the waveguide and the NFT;
 wherein the energy has a wavelength, wherein the at least one antireflective mechanism is in the NFT, wherein the NFT includes a first metal layer having a first entrance surface, a second metal layer having a second entrance surface and an insulating layer, the insulating layer being between the first metal layer and the second metal layer in a deposition direction perpendicular to the transmission direction, at least a portion of the first entrance surface being offset from at least a portion of the second entrance surface in the transmission direction by a distance that is greater than one-quarter of the wavelength.

9. The HAMR write apparatus of claim 8 wherein all of the first entrance surface is offset by the distance from all of the second entrance surface.

10. The HAMR write apparatus of claim 8 wherein a center of the insulating layer is offset in the deposition direction from a core center of the core of the waveguide.

11. The HAMR write apparatus of claim 8 wherein at least a first part of the first entrance surface is at a first nonzero acute angle from the transmission direction and wherein at least a second part of the second entrance surface is at a second nonzero acute angle from the transmission direction.

12. A heat assisted magnetic recording (HAMR) write apparatus coupled with a laser for providing energy, the HAMR write apparatus comprising:
 a pole for writing to a region of the media, the pole including a media-facing surface;
 at least one coil for energizing the pole;
 a waveguide optically coupled with the laser and including a core and cladding;
 a near-field transducer (NFT), the waveguide for directing a portion of the energy toward the NFT, the NFT located in a transmission direction from the core of the waveguide; and
 at least one antireflective mechanism residing in at least one of a first position in the waveguide, a second position in the NFT and a third position between the waveguide and the NFT;
 wherein the NFT has an entrance surface, at least a portion of the entrance surface is at a nonzero acute angle from the transmission direction.

13. A heat assisted magnetic recording (HAMR) data storage device comprising:
 a media,
 a laser for providing energy; and
 a slider including a HAMR write transducer, the HAMR write transducer including a pole, at least one coil, a waveguide, a near-field transducer (NFT) and at least one antireflective mechanism, the pole for writing to a region of the media and including a media-facing surface, the at least one coil for energizing the pole, the waveguide optically coupled with the laser and including a core and cladding, the waveguide for directing a portion of the energy toward the NFT, the NFT located in a transmission direction from the core of the waveguide, the at least one antireflective mechanism residing in at least one of a first position in the waveguide, a second position in the NFT and a third position between the waveguide and the NFT;
 wherein the at least one antireflective mechanism has a location selected from the first position within the waveguide and the third position between the waveguide and the NFT
 wherein the at least one antireflective mechanism includes a material having a thickness along the transmission direction selected to reduce reflections in a reflection direction opposite to the transmission direction, the material being selected from a high index material and a metal, the high index material having an index of refraction not less than a waveguide core index of refraction, the thickness of the metal being not more than one and one half multiplied by a metal skin depth.

14. The HAMR data storage device of claim 13 wherein the at least one antireflective mechanism includes at least one antireflective trench and wherein the at least one antireflective trench has a location selected from the first position within the waveguide and the third position between the waveguide and the NFT.

15. A heat assisted magnetic recording (HAMR) data storage device comprising:
a media,
a laser for providing energy; and
a slider including a HAMR write transducer, the HAMR write transducer including a pole, at least one coil, a waveguide, a near-field transducer (NFT) and at least one antireflective mechanism, the pole for writing to a region of the media and including a media-facing surface, the at least one coil for energizing the pole, the waveguide optically coupled with the laser and including a core and cladding, the waveguide for directing a portion of the energy toward the NFT, the NFT located in a transmission direction from the core of the waveguide, the at least one antireflective mechanism residing in at least one of a first position in the waveguide, a second position in the NFT and a third position between the waveguide and the NFT
wherein the energy has a wavelength, wherein the at least one antireflective mechanism is in the NFT wherein the NFT has a first metal layer having a first entrance surface, a second metal layer having a second entrance surface and an insulating layer, the insulating layer being between the first metal layer and the second metal layer in a deposition direction perpendicular to the transmission direction, at least a portion of the first entrance surface being offset from at least a portion of the second entrance surface in the transmission direction by a distance that is greater than one-quarter of the wavelength.

16. A heat assisted magnetic recording (HAMR) data storage device comprising:
a media,
a laser for providing energy; and
a slider including a HAMR write transducer, the HAMR write transducer including a pole, at least one coil, a waveguide, a near-field transducer (NFT) and at least one antireflective mechanism, the pole for writing to a region of the media and including a media-facing surface, the at least one coil for energizing the pole, the waveguide optically coupled with the laser and including a core and cladding, the waveguide for directing a portion of the energy toward the NFT, the NFT located in a transmission direction from the core of the waveguide, the at least one antireflective mechanism residing in at least one of a first position in the waveguide, a second position in the NFT and a third position between the waveguide and the NFT;
wherein the NFT has an entrance surface, at least a portion of the entrance surface is at a nonzero acute angle from the transmission direction.

17. A method for fabricating a heat assisted magnetic recording (HAMR) write apparatus coupled with a laser for providing energy, the method comprising:
providing a pole for writing to a region of the media, the pole including a media-facing surface;
providing at least one coil for energizing the pole;
providing a waveguide optically coupled with the laser and including a core and cladding;
providing a near-field transducer (NFT), the waveguide for directing a portion of the energy toward the NFT, the NFT located in a transmission direction from the core of the waveguide; and
providing at least one antireflective mechanism residing in at least one of a first position in the waveguide, a second position in the NFT and a third position between the waveguide and the NFT;
wherein the at least one antireflective mechanism has a location selected from the first position within the waveguide and the third position between the waveguide and the NFT;
wherein the at least one antireflective mechanism includes a material having a thickness along the transmission direction selected to reduce reflections in a reflection direction opposite to the transmission direction, the material being selected from a high index material and a metal, the high index material having an index of refraction not less than a waveguide core index of refraction, the thickness of the metal being not more than one and one half multiplied by a metal skin depth.

18. The method of claim 17 wherein the at least one antireflective mechanism includes at least one antireflective trench and wherein the at least one antireflective trench has a location selected from the first position within the waveguide and the third position between the waveguide and the NFT.

19. A method for fabricating a heat assisted magnetic recording (HAMR) write apparatus coupled with a laser for providing energy, the method comprising:
providing a pole for writing to a region of the media, the pole including a media-facing surface;
providing at least one coil for energizing the pole;
providing a waveguide optically coupled with the laser and including a core and cladding;
providing a near-field transducer (NFT), the waveguide for directing a portion of the energy toward the NFT, the NFT located in a transmission direction from the core of the waveguide; and
providing at least one antireflective mechanism residing in at least one of a first position in the waveguide, a second position in the NFT and a third position between the waveguide and the NFT;
wherein the energy has a wavelength, wherein the at least one antireflective mechanism is in the NFT wherein the NFT step of providing the NFT further includes:
providing a first metal layer having a first entrance surface;
providing an insulating layer;
providing a second metal layer having a second entrance surface, the insulating layer being between the first metal layer and the second metal layer in a deposition direction perpendicular to the transmission direction, at least a portion of the first entrance surface being offset from at least a portion of the second entrance surface in the transmission direction by a distance that is greater than one-quarter of the wavelength.

20. A method for fabricating a heat assisted magnetic recording (HAMR) write apparatus coupled with a laser for providing energy, the method comprising:
providing a pole for writing to a region of the media, the pole including a media-facing surface;
providing at least one coil for energizing the pole;
providing a waveguide optically coupled with the laser and including a core and cladding;
providing a near-field transducer (NFT), the waveguide for directing a portion of the energy toward the NFT, the NFT located in a transmission direction from the core of the waveguide; and
providing at least one antireflective mechanism residing in at least one of a first position in the waveguide, a second position in the NFT and a third position between the waveguide and the NFT;

wherein the NFT step of providing the NFT further includes:
   providing an entrance surface such that at least a portion of the entrance surface is at a nonzero acute angle from the transmission direction.

\* \* \* \* \*